United States Patent
Shi

(10) Patent No.: US 12,004,012 B2
(45) Date of Patent: Jun. 4, 2024

(54) METHOD AND DEVICE USED FOR DUPLICATE DATA TRANSMISSION

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 384 days.

(21) Appl. No.: 17/377,980

(22) Filed: Jul. 16, 2021

(65) Prior Publication Data

US 2021/0345178 A1  Nov. 4, 2021

Related U.S. Application Data

(63) Continuation of application No. PCT/CN2019/072059, filed on Jan. 16, 2019.

(51) Int. Cl.
*H04W 28/12* (2009.01)
*H04L 1/08* (2006.01)
*H04L 5/00* (2006.01)

(52) U.S. Cl.
CPC ............... *H04W 28/12* (2013.01); *H04L 1/08* (2013.01); *H04L 5/0055* (2013.01)

(58) Field of Classification Search
CPC ............. H04W 28/12; H04W 28/0231; H04W 28/0263; H04L 1/08; H04L 5/0055; H04L 5/0053; H04L 69/06; H04L 69/26; H04L 47/34

See application file for complete search history.

(56) References Cited

U.S. PATENT DOCUMENTS

| | | | |
|---|---|---|---|
| 2017/0302410 A1* | 10/2017 | Liu | H04W 72/21 |
| 2018/0199315 A1* | 7/2018 | Hong | H04L 47/34 |
| 2018/0376457 A1 | 12/2018 | Tseng et al. | |

(Continued)

FOREIGN PATENT DOCUMENTS

| | | |
|---|---|---|
| CN | 107342851 A | 11/2017 |
| CN | 108282823 A | 7/2018 |

(Continued)

OTHER PUBLICATIONS

First Office Action dated Nov. 24, 2022 From the CN patent Application No. CN202110968809.3.

(Continued)

*Primary Examiner* — Kiet Tang
(74) *Attorney, Agent, or Firm* — Quarles & Brady LLP

(57) ABSTRACT

Disclosed by the present application is a method used for duplicate data transmission, which may implement effective duplicate data transmission in more than two duplicate data transmission mechanisms. The method comprises: a terminal device receiving first indication information; and the terminal device carrying out processing for a PDCP PDU according to the first indication information, the first indication information being used to indicate that a duplicate data transmission function of at least one PDCP entity is active or inactive and/or indicate an RLC entity used for transmitting duplicate data among a plurality of RLC entities associated with the at least one PDCP entity respectively.

17 Claims, 20 Drawing Sheets

(56) References Cited

U.S. PATENT DOCUMENTS

2019/0098640 A1* 3/2019 Holakouei ........ H04W 28/0231
2019/0386779 A1* 12/2019 Hong ................ H04W 28/0263

FOREIGN PATENT DOCUMENTS

| CN | 109151903 A | 1/2019 |
|----|-------------|--------|
| WO | 2017132925 A1 | 8/2017 |
| WO | WO-2018-170891 A1 | 9/2018 |

OTHER PUBLICATIONS

"38321_CR(0185)_(REL-15)Introduction of PDCP duplication", 3GPP TSG RAN WG2 Meeting #102, R2-1809023 ; Jun. 1, 2018 (Jun. 1, 2018), Claim1-20.
Supplementary Search Report dated Jan. 12, 2022 From the Extended European search report(EESR) of the Application No. 19910091.8.
Examination Report dated Sep. 9, 2022 From the European patent Application No. 19910091.8.
3GPP TS 38.321 V15.8.0, 38321-f80, Dec. 2019, http://www.3gpp.org, 2 pages.
International Search Report and Written Opinion, dated Oct. 15, 2019, From the International Searching Authority Re. Application No. PCT/CN2019/072059, 11 pages.

* cited by examiner

| R | R | D/A | DRB ID | | | | |
|---|---|---|---|---|---|---|---|
| D7 | D6 | D5 | D4 | D3 | D2 | D1 | D0 |

← LCID of MCG first, LCID of SCG second

| R | R | D/A | DRB ID | | | | |
|---|---|---|---|---|---|---|---|
| D7 | D6 | D5 | D4 | D3 | D2 | D1 | D0 |

LCID of MCG    LCID of SCG

| R | R | D/A | DRB ID | | | | |
|---|---|---|---|---|---|---|---|
| D7 | D6 | D5 | D4 | D3 | D2 | D1 | D0 |

← In ascending order of LCID

FIG. 14A      FIG. 14B      FIG. 14C

METHOD AND DEVICE USED FOR DUPLICATE DATA TRANSMISSION

CROSS REFERENCE TO RELATED APPLICATIONS

This application is a continuation of International Application No. PCT/CN2019/072059, filed on Jan. 16, 2019, (WO-2020-147056-A1) which is hereby incorporated by reference.

BACKGROUND

Field of Disclosure

The embodiments of the present application relate to the field, and more specifically, to a method and a device used for duplicate data transmission.

BACKGROUND

In a dual connectivity (DC) scenario, a plurality of network nodes such as a master base station (master eNB, MN) and a secondary base station (secondary eNB, SN) can serve a terminal device, and the plurality of base stations and the terminal device can perform duplicate data transmission.

In a carrier aggregation (CA) scenario, packet data convergence protocol (PDCP) can duplicate a PDCP protocol data unit (PDU) into two identical ones, which are to be mapped respectively onto different radio link control (RLC) entities and then mapped, via a media access control (MAC) entity, onto two physical carriers, thereby achieving frequency diversity gain and thus improving reliability of data transmission.

In new radio (NR) systems, the number of radio link control (RLC) entities associated with the PDCP entity (data radio bearer, DRB) may be greater, and the number of PDCP PDUs that the PDCP entity can duplicate may also be greater. Therefore, how to effectively perform duplicate data transmission has become an urgent issue to be solved.

SUMMARY OF DISCLOSURE

The embodiments of the present application provide a method and a device used for duplicate data transmission, which can realize effective duplicate data transmission.

In a first aspect, a method used for duplicate data transmission is provided, including: a terminal device receiving first indication information; and the terminal device carrying out processing for a PDCP PDU according to the first indication information, the first indication information being used to indicate that a duplicate data transmission function of at least one PDCP entity is active or inactive and/or indicate an RLC entity used for transmitting duplicate data among a plurality of RLC entities associated with the at least one PDCP entity respectively.

In a second aspect, a method used for duplicate data transmission is provided, including: a network device transmitting first indication information; and the first indication information being used by a terminal device to carry out processing for a PDCP PDU, the first indication information being used to indicate that a duplicate data transmission function of at least one PDCP entity is active or inactive and/or indicate an RLC entity used for transmitting duplicate data among a plurality of RLC entities associated with the at least one PDCP entity respectively.

In a third aspect, a terminal device is provided, which can perform the method in the foregoing first aspect or any optional implementation of the first aspect. Specifically, the terminal device can include a functional module for performing the method in the foregoing first aspect or any possible implementation of the first aspect.

In a fourth aspect, a network device is provided, which can perform the method in the foregoing second aspect or any optional implementation of the second aspect. Specifically, the network device can include a functional module for performing the method in the foregoing second aspect or any possible implementation of the second aspect.

In a fifth aspect, there is provided a terminal device including a processor and a memory. The memory is used for storing a computer program, and the processor is configured to call and run the computer program stored in the memory to perform the method in the above-mentioned first aspect or any possible implementation of the first aspect.

In a sixth aspect, there is provided a network device including a processor and a memory. The memory is used for storing a computer program, and the processor is configured to call and run the computer program stored in the memory to perform the method in the above-mentioned second aspect or any possible implementation of the second aspect.

In a seventh aspect, a chip is provided to implement the method in the foregoing first aspect or any possible implementation of the first aspect. Specifically, the chip includes a processor configured to call and run a computer program from a memory to cause the device installed with the chip to perform the method in the first aspect or any possible implementation of the first aspect.

In an eighth aspect, a chip is provided to implement the method in the foregoing second aspect or any possible implementation of the second aspect. Specifically, the chip includes a processor configured to call and run a computer program from a memory to cause the device installed with the chip to perform the method in the second aspect or any possible implementation of the second aspect.

In a ninth aspect, a computer-readable storage medium is provided for storing a computer program that causes a computer to perform the method in the above-mentioned first aspect or any possible implementation of the first aspect.

In a tenth aspect, a computer-readable storage medium is provided for storing a computer program that causes a computer to perform the method in the above-mentioned second aspect or any possible implementation of the second aspect.

In an eleventh aspect, a computer program product is provided, including computer program instructions that cause a computer to perform the method in the foregoing first aspect or any possible implementation of the first aspect.

In an twelfth aspect, a computer program product is provided, including computer program instructions that cause a computer to perform the method in the foregoing second aspect or any possible implementation of the second aspect.

In a thirteenth aspect, a computer program is provided, which when running on a computer, causes the computer to perform the method in the first aspect or any possible implementation of the first aspect.

In a fourteenth aspect, a computer program is provided, which when running on a computer, causes the computer to perform the method in the second aspect or any possible implementation of the second aspect.

In a fifteenth aspect, a communication system is provided, including a terminal device and a network device.

The network device is configured to: transmit first indication information to the terminal device.

The terminal device is configured to: receive the first indication information transmitted by the network device.

The first indication information is used to indicate that a duplicate data transmission function of at least one PDCP entity is active or inactive and/or indicate an RLC entity used for transmitting duplicate data among a plurality of RLC entities associated with the at least one PDCP entity respectively.

Based on the above technical solutions, the first indication information is used to indicate that a duplicate data transmission function of at least one PDCP entity is active or inactive and/or indicate an RLC entity used for transmitting duplicate data among a plurality of RLC entities associated with the at least one PDCP entity respectively, such that in a duplicate data transmission mechanism with more than two copies, effective duplicate data transmission can still be realized.

BRIEF DESCRIPTION OF THE DRAWINGS

FIG. 14(a), FIG. 14(b), and FIG. 14(c) are schematic diagrams of implementation of first indication information according to an embodiment of the present application.

DETAILED DESCRIPTION

The following will describe technical solutions of implementations with reference to the accompanying drawings.

The technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD) system, an advanced long term evolution (LTE-A) system, a new radio (NR) system, an evolution system of a NR system, a LTE-based access to unlicensed spectrum (LTE-U) system, a NR-based access to unlicensed spectrum (NR-U) system, an universal mobile telecommunication system (UMTS), a global interoperability for microwave access (WiMAX) communication system, wireless local area networks (WLAN), wireless fidelity (Wi-Fi), a future 5G system (may also be called a new radio (NR) system) or other communication systems, etc.

Optionally, a network device or a network node mentioned in the embodiments of the present application can provide a communication coverage for a specific geographic area, and can communicate with a terminal device located in the coverage area. Optionally, the network device may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a relay station, an access point, an in-vehicle device, a wearable device, a network-side device in a future 5G network, or a network device in a future evolved public land mobile network (PLMN).

A terminal device of implementations may be mobile or fixed. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a future 5G network, a terminal device in a future evolved PLMN, etc.

NR supports two modes of duplicate data transmission: duplicate data transmission in a DC scenario (DC duplication) and duplicate data transmission in a CA scenario (CA duplication).

Figure 1:
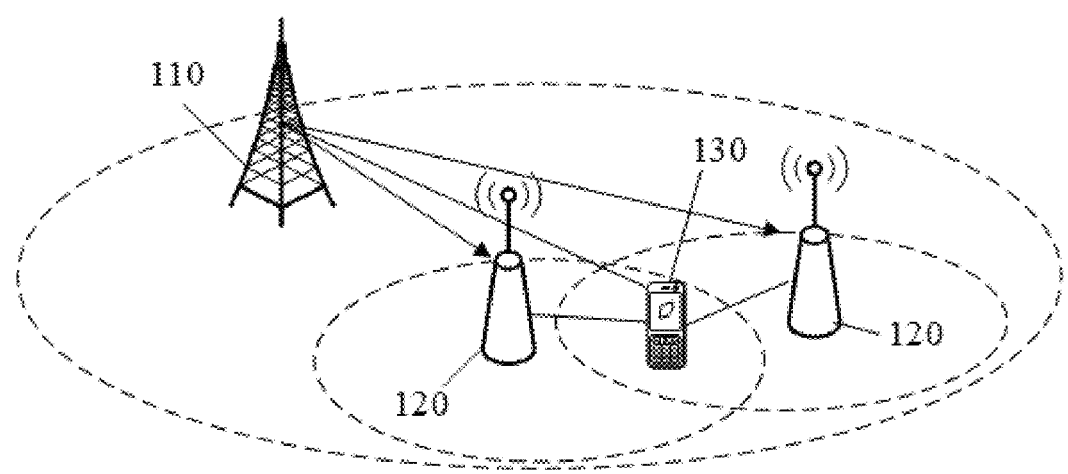
FIG. 1 is a schematic diagram of a multi connectivity scenario.

In a DC scenario, the terminal device can be served by multiple cell groups (CG). The multiple CGs may include, for example, a master CG (MCG) or a secondary CG (SCG) (also referred to as an MN or an SN respectively). As illustrated in FIG. 1, network devices around a terminal device 130 include an MN 110 and at least one SN 120. The at least one SN 120 is respectively connected with the MN 110 to form a multi-connectivity and is respectively connected with the terminal device 130 to provide services for the terminal device 130.

The MN 110 may be an LTE network, and the at least one SN 120 may be an NR network. Alternatively, the MN 110 may be an NR network, and the at least one SN 120 may be an LTE network. Alternatively, the MN 110 and the at least one SN 120 are both NR networks. In addition, the MN may be a BTS in a GSM or in a CDMA system, and the at least one SN may also be a BTS in a GSM or in a CDMA system. The disclosure is not limited in this regard.

The terminal device 130 may simultaneously establish connections with the MN 110 and the at least one SN 120. The connection established between the terminal device 130 and the MN 110 is a primary connection, and the connection established between the terminal device 130 and the at least one SN 120 is a secondary connection. Control signaling of the terminal device 130 may be transmitted through the primary connection, and data of the terminal device may be transmitted simultaneously through the primary connection and the secondary connection or may be transmitted through the secondary connection only.

Figure 2:
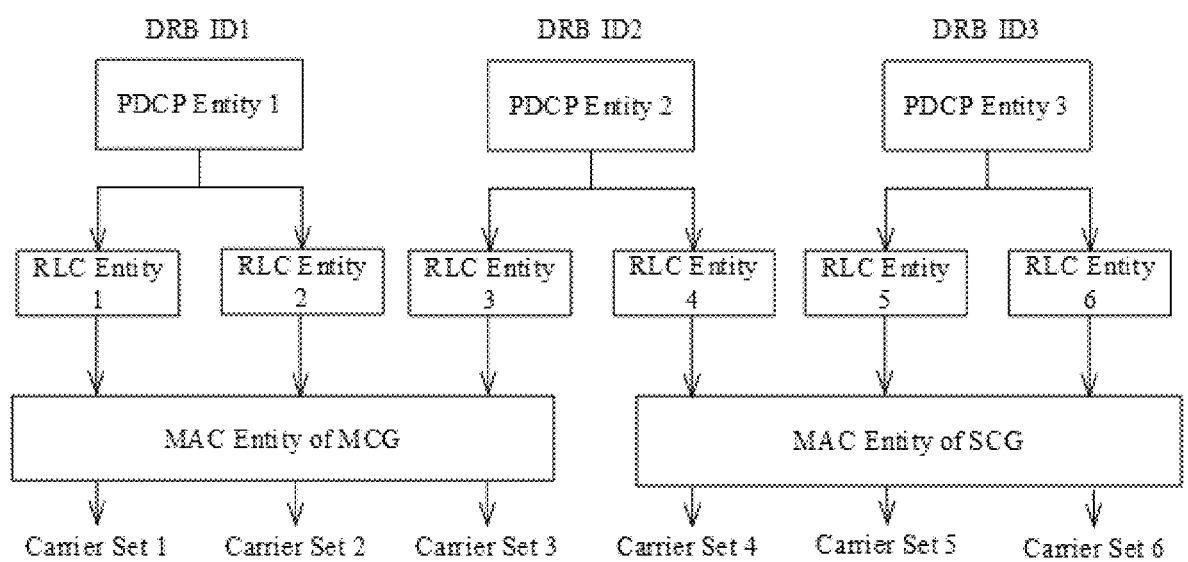
FIG. 2 is a schematic architecture diagram of duplicate data transmission in a DC scenario and a CA scenario.

Duplicated data can be transmitted between the terminal device and the MN and/or the SN. Transmission of duplicated data complies with a split bearer-based protocol architecture. For example, in schematic architecture diagram of duplicate data transmission illustrated in FIG. 2, FIG. 2 illustrates three PDCP entities: PDCP entity 1, PDCP entity 2, and PDCP entity 3. Each PDCP entity uniquely corresponds to a data radio bearer (DRB) or signaling radio bearer (SRB). The following uses DRB as an example for description, corresponding DRB identities of PDCP entity 1, PDCP entity 2, and PDCP entity 3 are DRB ID1, DRB ID2, and DBRID3 in sequence.

For duplicate data transmission under a DC, for example, refer to the PDCP entity 2 illustrated in FIG. 2. PDCP entity 2 is associated with two different RLC entities: RLC entity 3 and RLC entity 4. The RLC entity 3 and the RLC entity 4 are respectively associated with two different media access control (MAC) entities: a MAC entity of MCG and a MAC entity of SCG. For uplink and downlink transmissions, the PDCP entity duplicate a PDCP PDU into the same two copies. The two PDCPs pass through the RLC entity and the MAC entity of different CGs, then reach the corresponding MAC entity and RLC entity of the terminal device (downlink) or the base station (uplink) through an air interface, and finally converge to the PDCP entity. The PDCP layer detects that the two PDCP PDUs are the same copy version. For example, it can be determined by whether the two PDCP PDUs have the same serial number (SN). When the SN of the two PDCP PDUs is the same, one of the PDCP PDUs is discarded, and the other PDCP PDU is delivered to a higher layer. It should be noted that the two copied PDCP PDUs do not necessarily arrive at the PDCP layer at the same time.

In a CA scenario, a PDCP entity can duplicate a PDCP PDU into two identical ones, which are to be mapped respectively onto different RLC entities and then mapped, via a MAC entity, onto two physical carriers, thereby achieving frequency diversity gain and thus improving reliability of data transmission.

The duplicate data transmission under CA is, for example, PDCP entity 1 and PDCP entity 3 illustrated in FIG. 2. The duplicate data transmission under CA uses the CA's protocol architecture. PDCP entity 1 and PDCP entity 3 are respectively associated with two different RLC entities, PDCP entity 1 is associated with RLC entity 1 and RLC entity 2, and PDCP entity 3 is associated with RLC entity 5 and RLC entity 6. RLC entity 1 and RLC entity 2 are associated with the same MAC entity, that is, the MAC entity of MCG; RLC entity 5 and RLC entity 6 are associated with the same MAC entity, that is, the MAC entity of SCG. For uplink and downlink transmissions, each PDCP entity duplicates the PDCP PDU into the same two copies. Each PDCP entity passes through a different RLC entity and the same MAC entity, and then reaches the terminal device (downlink) or the base station (uplink) via the air interface. The corresponding MAC entity and RLC entity are finally converged to the PDCP entity. The PDCP layer detects that the two PDCP PDUs are the same copy version. For example, it can be determined by whether the two PDCP PDUs have the same SN. When the SN of the two PDCP PDUs are the same, one of the PDCP PDUs is discarded, and the other A PDCP PDU is delivered to the upper layer. It should be noted that the two copied PDCP PDUs do not necessarily arrive at the PDCP layer at the same time.

As illustrated in FIG. 2, the duplicate data may be restricted to different carriers for transmission. For duplicate data transmission under DC, since different RLC entities are respectively associated with different MAC entities, the duplicated PDCP PDUs can naturally be transmitted on different carriers. For duplicated data transmission under CA, since different RLC entities are associated with the same MAC entity, the protocol currently configures a logical channel priority (LCP) mapping parameter for a logical channel corresponding to each RLC entity, such as a set of carriers available for the logical channel (allowed serving cells) is used to limit data of the logical channel to only be transmitted on the corresponding carrier. Configuring the LCP mapping parameter can ensure that the duplicate data passing through different RLC entities can be transmitted on different carriers even if passing through the same MAC entity.

Figure 3A:
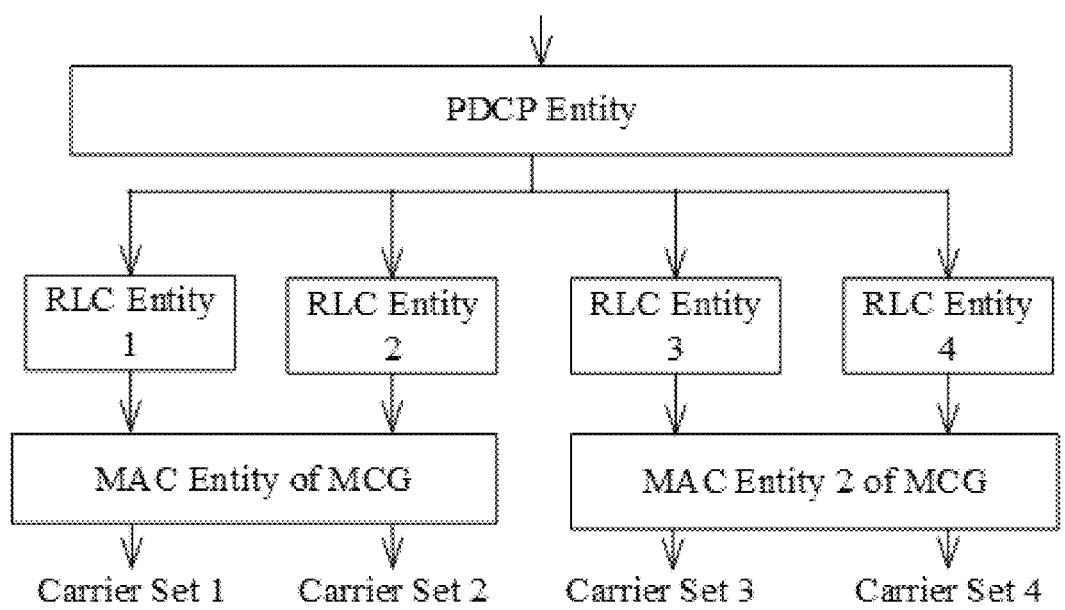
FIG. 3(a) and FIG. 3(b) are schematic diagrams of a duplicate data transmission mechanism for more than two copies according to an embodiment of the present application.

In order to make full use of the data duplicate function in the DC scenario and the CA scenario to obtain higher resource usage and data transmission reliability, the embodiments of the present application introduce a duplicate data transmission mechanism with more than two copies, that is, each PDCP entity is associated with more than two RLC entities, each PDCP entity can also generate more than two copies of duplicate data. For example, as illustrated in FIG. 3(a), the PDCP entity is associated with four RLC entities, and each RLC entity corresponds to a logical channel. For each logical channel associated with a MAC entity, it has a unique logical channel identity (LCD). The PDCP PDU can be transmitted through the logical channels corresponding to the four RLC entities. If RLC entity 2 and RLC entity 3 are used to transmit duplicate data, the transmission is duplicate PDCP PDUs in the DC scenario. If RLC entity 1 and RLC entity 2 or RLC entity 3 and RLC entity 4 are used to transmit duplicate data, the transmission then corresponds the duplicate PDCP PDU in the CA scenario. RLC entity 1 and RLC entity 2 are RLC entities of MCG, and RLC entity 3 and RLC entity 4 are RLC entities of SCG. The PDCP PDUs transmitted by the RLC entity 1 and the RLC entity 2 are respectively mapped to carriers in a carrier set 1 and a carrier set 2 through the MAC entity of the MCG. The duplicate PDCP PDUs transmitted by the RLC entity 3 and the RLC entity 4 are mapped to carriers in a carrier set 3 and a carrier set 4 through the MAC entity 2 of the SCG, respectively. Theoretically, the duplicate PDCP PDU can be transmitted on up to 4 physical carriers, achieving higher resource usage and data transmission reliability.

Figure 3B:
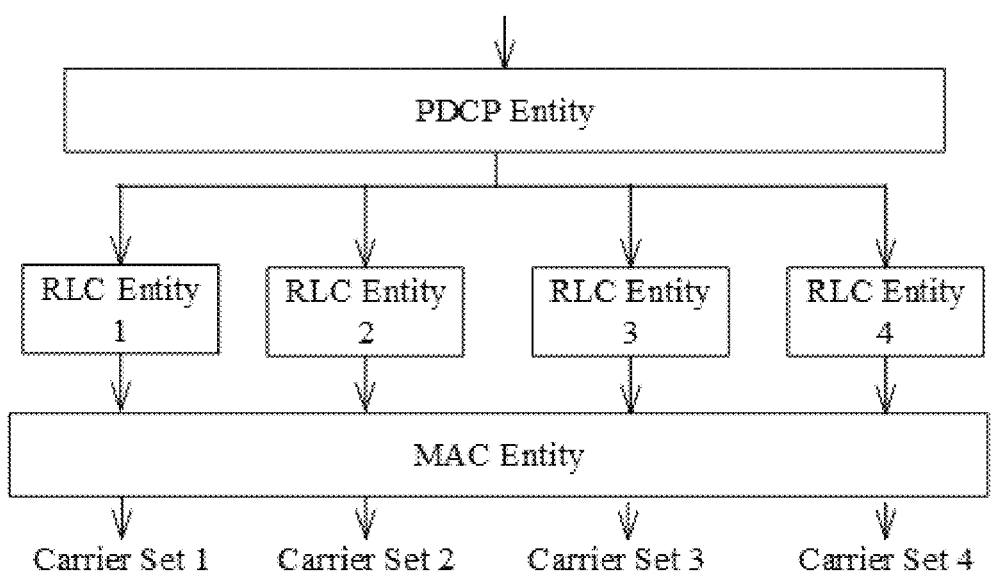

Another example is the duplicate data transmission in the CA-only scenario illustrated in FIG. 3(*b*). Multiple RLC entities associated with PDCP can be associated with the same MAC entity, such as the MAC entity of MCG or the MAC entity of SCG.

When transmitting duplicate data, a terminal device needs to know which PDCP entities are active or inactive, and which RLC entities of the multiple RLC entities associated with each PDCP entity can currently be used to transmit duplicate data. For example, as illustrated in FIG. 3, the terminal device not only needs to know whether the PDCP entity is active or inactive, and when the PDCP entity is active, the terminal device also needs to know which RLC entities of the 4 RLC entities associated with the PDCP entity are used for duplicate data transmission.

The embodiments of the present application provide a method based on duplicate data transmission, which can also realize effective duplicate data transmission in a duplicate data transmission mechanism with more than two copies.

It should be understood that the duplicate data transmission mechanism with more than two copies described in the embodiments of the present application refer to that the number of RLC entities associated with a PDCP entity may be greater than two, but this does not mean that does not mean that the number of copies of the PDCP PDU is greater than 2. For example, the PDCP entity is associated with 4 RLC entities, but duplicates two PDCP PDUs, and the two PDCP PDUs are respectively transmitted on two of the four RLC entities. Hereinafter, these two RLC entities are referred to as the RLC entity used to transmit duplicate data. The RLC entity used to transmit the duplicate data may be different each time. When a channel condition of the used RLC entity changes, other RLC entities of the four RLC entities may be used to transmit the duplicate data.

Figure 4:
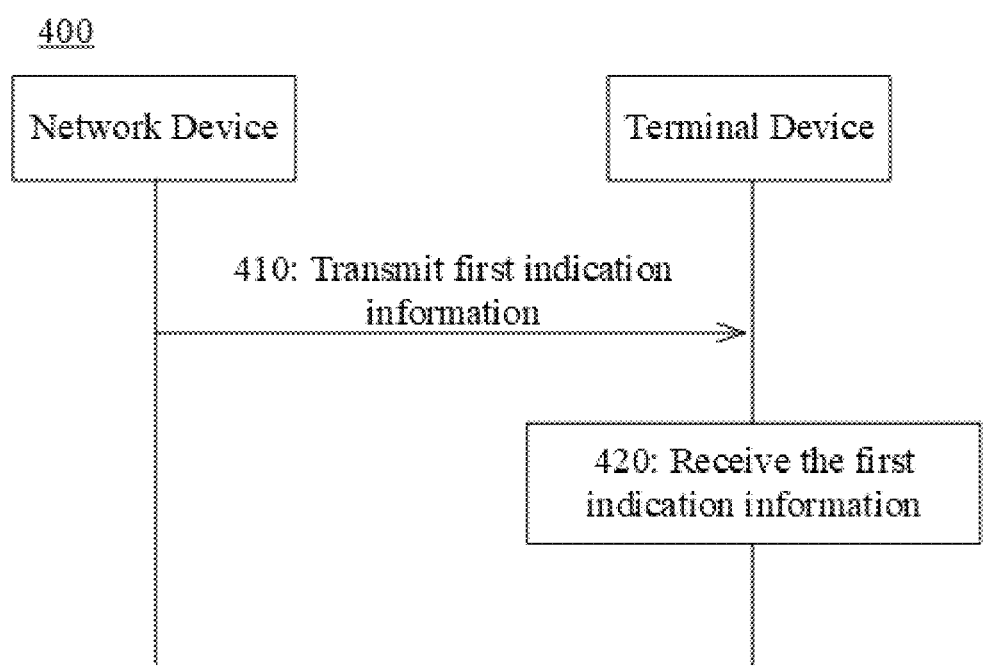
FIG. 4 is a flow interaction diagram of a method used for duplicate data transmission according to an embodiment of the present application.

FIG. 4 is a flow interaction diagram of a method used for duplicate data transmission according to an embodiment of the present application. The method 400 may be executed by a terminal device and a network device. The terminal device may be, for example, the terminal device 130 illustrated in FIG. 1. The network device may be, for example, the master base station 110 or the secondary base station 120 illustrated in FIG. 1 or may also be a core network device. As illustrated in FIG. 4, the method 400 used for duplicate data transmission includes some or all of the following steps.

In 410, the network device sends the first indication information to the terminal device.

In 420, the terminal device receives the first indication information sent by the network device.

The first indication information being used to indicate that a duplicate data transmission function of at least one PDCP entity is active or inactive and/or indicate an RLC entity used for transmitting duplicate data among a plurality of RLC entities associated with the at least one PDCP entity respectively.

The at least one PDCP entity may include, for example, a PDCP entity for duplicate data transmission based on a CA and/or a PDCP entity for duplicate data transmission based on a DC. In addition, one PDCP entity in the embodiments of the present application can be associated with any number of RLC entities.

After receiving the first indication information, the terminal device may, for example, perform data duplicate processing on a PDCP PDU according to the first indication information, and send the processed PDCP PDU to the network device.

Optionally, the first indication information is carried in a media access control control element (MAC CE).

Figure 5:
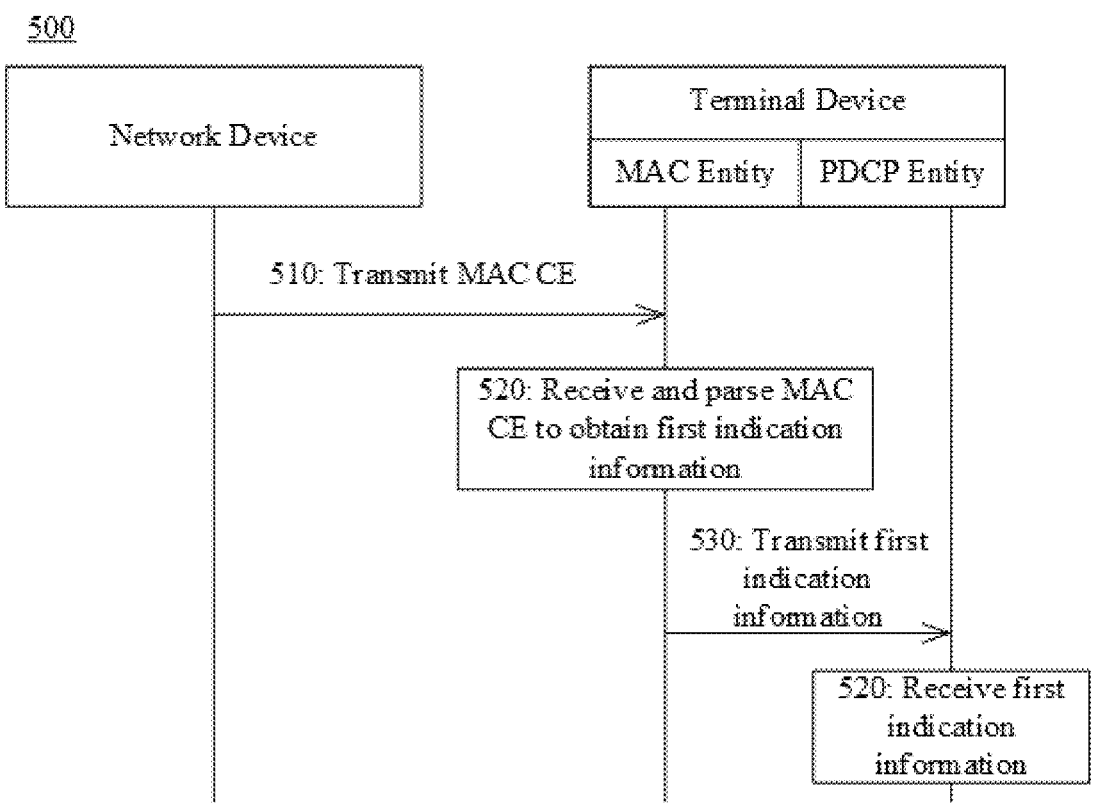
FIG. 5 is a flow interaction diagram of a method used for duplicate data transmission according to an embodiment of the present application.

For example, as illustrated in FIG. 5, the first indication information is carried in the MAC CE, and the method 500 used for duplicate data transmission includes 510 to 540.

In 510, the network device sends a MAC CE to the terminal device.

In 520, the MAC entity of the terminal device receives and parses the MAC CE to obtain the first indication information.

In 530, the MAC entity of the terminal device sends the first indication information to the PDCP entity of the terminal device.

In 540, the PDCP entity of the terminal device receives the first indication information.

When the network device needs to activate/deactivate the duplicate data transmission function of one or more PDCP entities, the network device can send a MAC CE to the terminal device, and the MAC CE carries the first indication information. The MAC entity of the terminal device interprets the MAC CE after receiving the MAC CE, and obtains the first indication information, that is, the information of the activated/deactivated PDCP entity and/or the RLC entity used to transmit duplicate data, and MAC entity instructs the parsed information to the PDCP entity, so that the PDCP entity processes the PDCP PDU based on the information.

When the first indication information indicates that the duplicate data transmission function of a certain PDCP entity is active, at least part of the multiple RLC entities associated with the PDCP entity may be used to transmit the duplicate data. The terminal device may determine the activated/deactivated PDCP entity according to the received first indication information, and further, the terminal device can determine according to the first indication information which RLC entities associated with the activated PDCP entity can currently transmit the duplicate data, and how many copies of the PDCP PDU are duplicated.

When each PDCP entity is only associated with two RLC entities, one byte or one octet (bytes are taken as examples below) can be used to indicate the activated/deactivated PDCP entity. Each bit in the byte or octet corresponds to a PDCP entity, and each bit is used to indicate whether the corresponding PDCP entity activates or deactivates the duplicate data transmission function. Moreover, there is no need to indicate which RLC entity is used to transmit the duplicate data, because both RLC entities can be used to transmit the duplicate data.

However, when the PDCP entity is associated with more RLC entities and can duplicate more PDCP PDUs, it not only needs to instruct activation/deactivation of the PDCP entity, but also to indicate which RLC entities among the RLC entities associated with the activated PDCP entity are used to transmit duplicate data.

In the embodiments of the present application, the first indication information is used to indicate the activation/deactivation of the duplicate data transmission function of at least one PDCP entity, and to indicate the RLC used to transmit duplicate data among the multiple RLC entities associated with the at least one PDCP entity. The entity can still realize effective duplicate data transmission in a duplicate data transmission mechanism with more than two copies.

In order to enable the first indication information to indicate the foregoing content, the embodiments of the present application provide different implementation manners of the first indication information, which are described below with reference to FIG. 6 to FIG. 16, respectively.

Hereinafter, the PDCP entity is also referred to as a radio bearer, which can be identified by using a DRB ID; and the RLC entity is referred to as a logical channel, which can be identified by using an LCD.

Implementation 1

Optionally, the at least one PDCP entity includes N PDCP entities, and N is a positive integer.

The first indication information includes M fields, wherein each field comprises N bits, the N PDCP entities respectively correspond to the N bits, and plurality of RLC entities associated with the same PDCP entity respectively correspond to plurality of bits in the same position in the M fields, where each bit is used to indicate whether the RLC entity corresponding to each bit is used to transmit duplicate data, M and N are positive integers, and M is a maximum number of the RLC entities associated with one PDCP entity.

The M fields may be respectively located in M bytes or M octets, for example.

That is, the first indication information includes M bytes, each byte includes 8 bits, and the first N bits from the right among the 8 bits of each byte respectively correspond to N PDCP entities, and 1≤N≤8.

It should be understood that the number of N is less than or equal to the total number of PDCP entities configured with the duplicate data transmission function. For example, as illustrated in FIG. 2, it is assumed that there are three PDCP entities configured with a duplicate data transmission function, namely PDCP entity 1, PDCP entity 2, and PDCP entity 3. The first indication information received from the MAC entity of the MCG may include activation/deactivation information of the PDCP entity 1 and the PDCP entity 2 and the duplicate data transmission information of the RLC entity. The first indication information received from the MAC entity of the SCG may include activation/deactivation information of the PDCP entity 2 and the PDCP entity 3 and the duplicate data transmission information of the RLC entity. That is, the first indication information received from the MAC entity of the MCG or the MAC entity of the SCG does not necessarily indicate all the PDCP entity 1, the PDCP entity 2, and the PDCP entity 3, and only needs to indicate the information of the PDCP entity associated with itself.

Figure 6A:
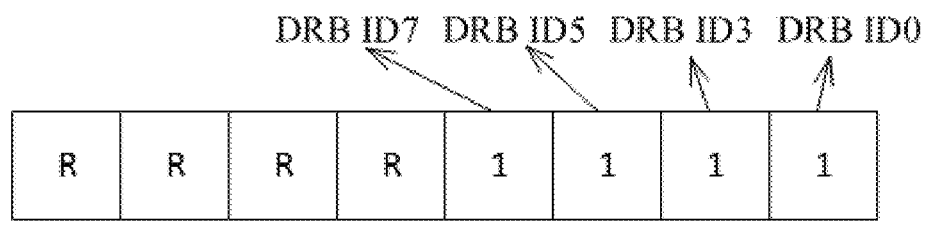
FIG. 6(a) and FIG. 6(b) are schematic diagrams of implementation of first indication information according to an embodiment of the present application.
Figure 6B:
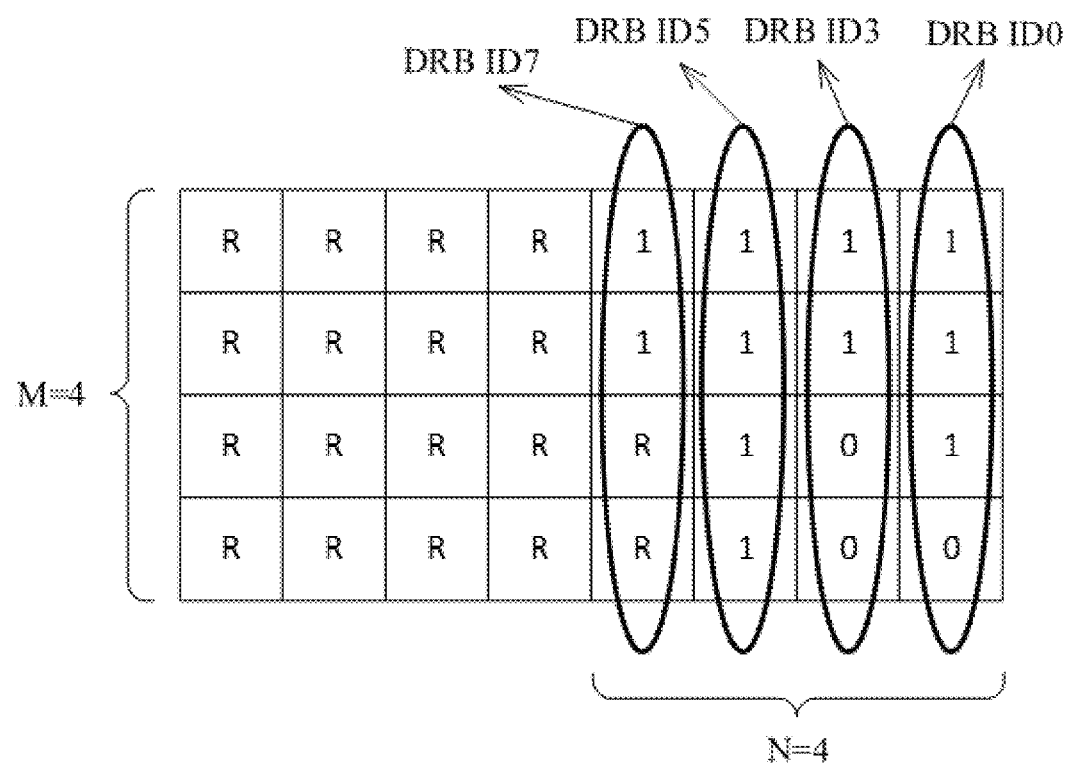

Take FIG. 6(b) as an example for description. The first indication information is carried in the MAC CE, and a format of the MAC CE includes at least M bytes, assuming that M=4, that is, the maximum number of RLC entities associated with PDCP is 4. Assume that N=4, and corresponding logical channel identifiers are DRB ID0, DRB ID3, DRB ID5, and DRB ID7, respectively.

The first to fourth columns from the right correspond to DRB ID0, DRB ID3, DRB ID5, and DRB ID7, respectively. The bits in rows 1-4 in the first column correspond to 4 RLC entities associated with DRB ID0, respectively. The bits in rows 1-4 in the second column respectively correspond to 4 RLC entities associated with the DRB ID3. The bits in rows 1-4 in the third column respectively correspond to 4 RLC entities associated with DRB ID5. The bits in the first row and the second row of the fourth column respectively correspond to two RLC entities associated with the DRB ID7. Here, the number of RLC entities associated with each PDCP entity may be the same or different. For example, the number of RLC entities associated with PDCP entities corresponding to DRB ID0, DRB ID 3, and DRBID 5 are all 4, and the number of RLC entities associated with PDCP entities corresponding to DRB ID7 is 2. Each small square represents a bit. The value of each bit is used to indicate whether the RLC entity corresponding to the bit is currently used to transmit duplicate data. In the following, it is assumed that a bit value of 0 indicates that it is not used to transmit duplicate data, and a bit value of 1 indicates that it is used to transmit duplicate data.

Or, instead of using FIG. 6(a), FIG. 6(b) is used to obtain an activated/deactivated DRB. When the bit value of the column corresponding to the DRB is all 0 or there is a bit value 1, it means that the duplicate data transmission function of the DRB is deactivated; when at least two bits in the bit value of the column corresponding to the DRB have a value of 1, it means that the duplicate data transmission function of the DRB is activated, and the RLC corresponding to the two bits is used to transmit the duplicate data.

After determining the activation/deactivation of the replication data transmission function of each PDCP entity, determine which RLC entities of the RLC entities associated with the activated PDCP entity are used to transmit the duplicate data. As illustrated in FIG. 6(b), the first three RLC entities associated with the PDCP entity associated with DRB ID0 are used to transmit duplicate data. The first two RLC entities associated with the PDCP entity associated with the DRB ID3 are used to transmit duplicate data. The four RLC entities associated with the PDCP entity associated with the DRB ID5 are all used to transmit duplicate data. The two RLC entities associated with the PDCP entity associated with the DRB ID7 are both used to transmit duplicate data.

In the manner illustrated in FIG. 6(b), the RLC entity used to transmit the duplicate data among the multiple RLC entities associated with the multiple PDCP entities can be indicated at the same time.

It should be understood that the DRB ID0, DRB ID3, DRB ID5, and DRB ID7 illustrated in FIG. 6(b) are in the order of the size of the DRB ID, for example, in ascending order, corresponding to 4 columns of bits from right to left. However, the present application is not limited to this, and DRB ID0, DRB ID3, DRB ID5, and DRB ID7 may also correspond to other bits of columns, respectively.

In addition, the PDCP indicated by the first indication information may include PDCP using the duplicate data function in the DC scenario and/or PDCP using the duplicate data function in the CA scenario. However, for PDCP that uses the duplicate data function in the CA scenario, the associated MAC entity is the same as the MAC entity that transmits the first indication information.

The meanings of the bit row and bit column in FIG. 6(b) can be exchanged. Optionally, the at least one PDCP entity includes N PDCP entities, and N is a positive integer.

The first indication information comprises N fields, and the N PDCP entities respectively correspond to the N fields, wherein each field comprises plurality of bits, and the plurality of bits respectively correspond to the plurality of RLC entities associated with the PDCP entity corresponding to each field, wherein each bit is used to indicate whether the RLC entity corresponding to each bit is used to transmit duplicate data.

The N fields may be located in N bytes or N octets, for example.

Figure 7:
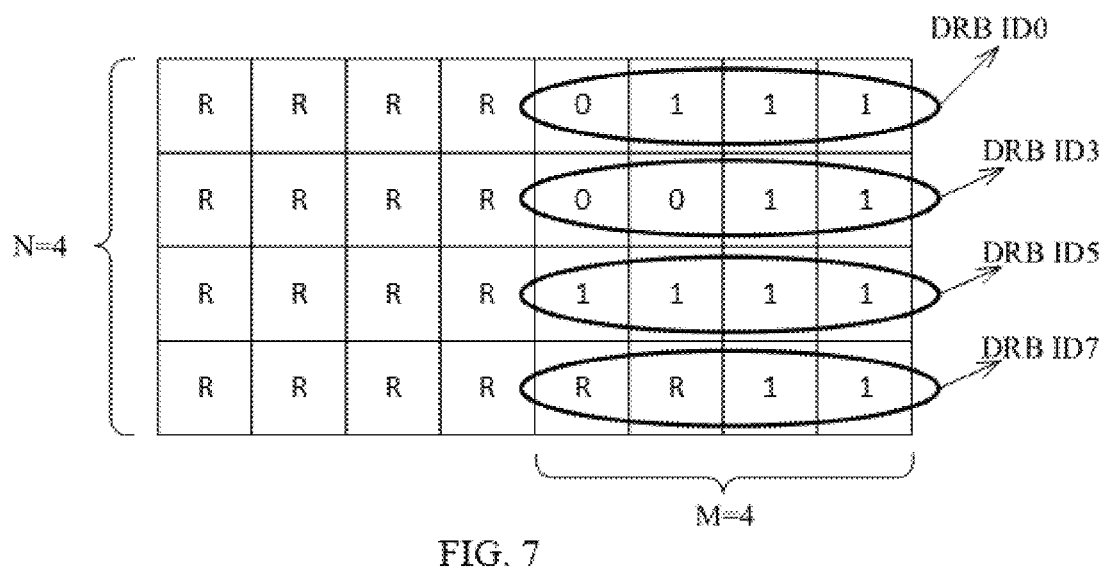
FIG. 7 is a schematic diagram of implementation of first indication information according to an embodiment of the present application.

Taking FIG. 7 as an example, rows 1 to 4 correspond to DRB ID0, DRB ID3, DRB ID5, and DRB ID7 in sequence. From right to left, the first 4 bits in the first row correspond to the 4 RLC entities associated with DRB ID0. The first 4 bits in the second row correspond to the 4 RLC entities associated with the DRB ID3 in sequence. The first 4 bits in the third row correspond to the 4 RLC entities associated with DRB ID5 in sequence. The first two bits in the fourth row correspond to the two RLC entities associated with the DRB ID7 in sequence. It can be understood that the first three RLC entities associated with DRB ID0 are used to transmit duplicate data. The first three RLC entities associated with DRB ID3 are used to transmit duplicate data. The 4 RLC entities associated with DRB ID5 are all used to transmit duplicate data. The two RLC entities associated with DRB ID7 are both used to transmit duplicate data.

The at least one PDCP entity indicated by the first indication information may include a PDCP entity for duplicate data transmission based on a CA and may also include a PDCP entity for duplicate data transmission based on a DC. For CA duplicate data transmission, the RLC entities associated with the PDCP entity are all associated with the same MAC entity, so that LCIDs of the RLC entities are different.

Figure 8:
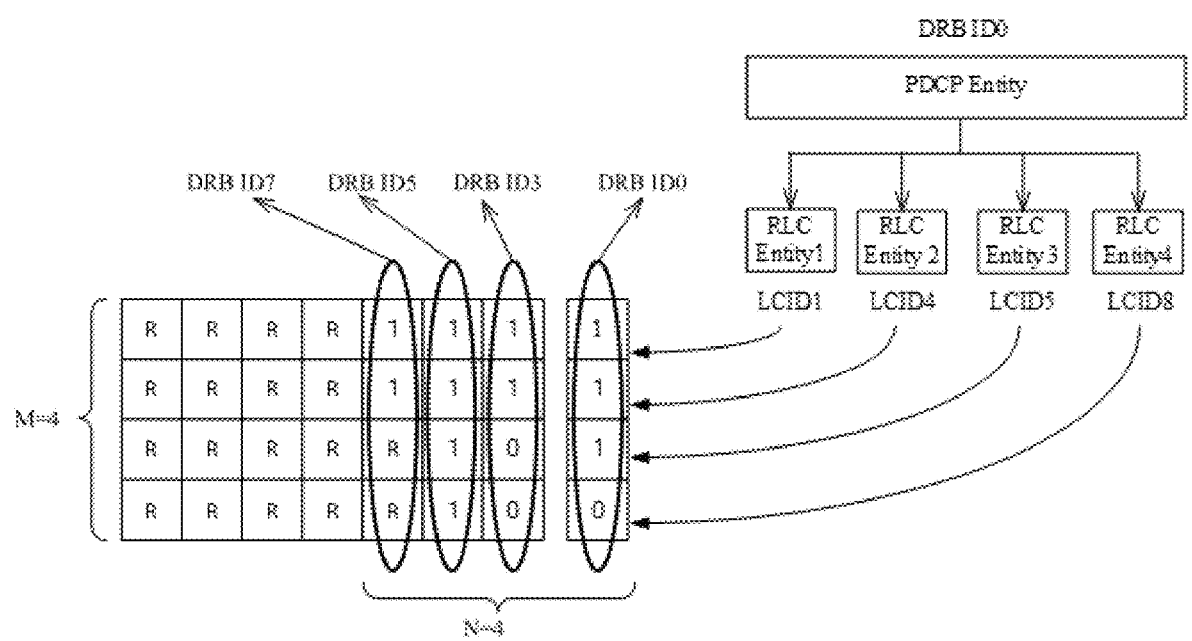
FIG. 8 is a schematic diagram of implementation of first indication information in a CA scenario according to an embodiment of the present application.

Taking FIG. 8 as an example, it is assumed that logical channels corresponding to four RLC entities associated with DRB ID0 are LCID 1, LCID 4, LCID 5, and LCID 8, respectively. LCID 1, LCID 4, LCID 5, and LCID 8 can correspond to 4 bits in the first column in order from top to bottom. As illustrated in FIG. 8, if a network device wants to activate the duplicate data transmission function of DRB ID0 and wants DRB ID0 to transmit the duplicate data through RLC entity 1, RLC entity 2, and RLC entity 3, then the first 3 rows of the first column are set to 1, and the last row is set to 0.

However, for DC duplicate data transmission, the RLC entities associated with the PDCP entity may be associated with MAC entities of different CGs, so that LCIDs of the RLC entities of different MAC entities may be the same. The different CGs described here may include MCG and SCG or may include more than two CGs. The duplicate data transmission in the DC scenario may include the case where one CG has one RLC entity, or the case where one CG has multiple RLC entities.

Considering that the LCIDs of the RLC entities corresponding to different MAC entities may be the same, the RLC entity of the MCG and the RLC entity of the SCG may be respectively corresponded. The embodiments of the present application provides two ways to map RLC entities of different CGs to bit rows or bit columns corresponding to PDCP entities associated with the RLC entities.

A possible implementation manner is that, among the N PDCP entities, multiple RLC entities associated with the PDCP entity for duplicate data transmission based on DC correspond to the multiple bits in sequence according to the order of the cell group to which they belong.

Figure 9A:
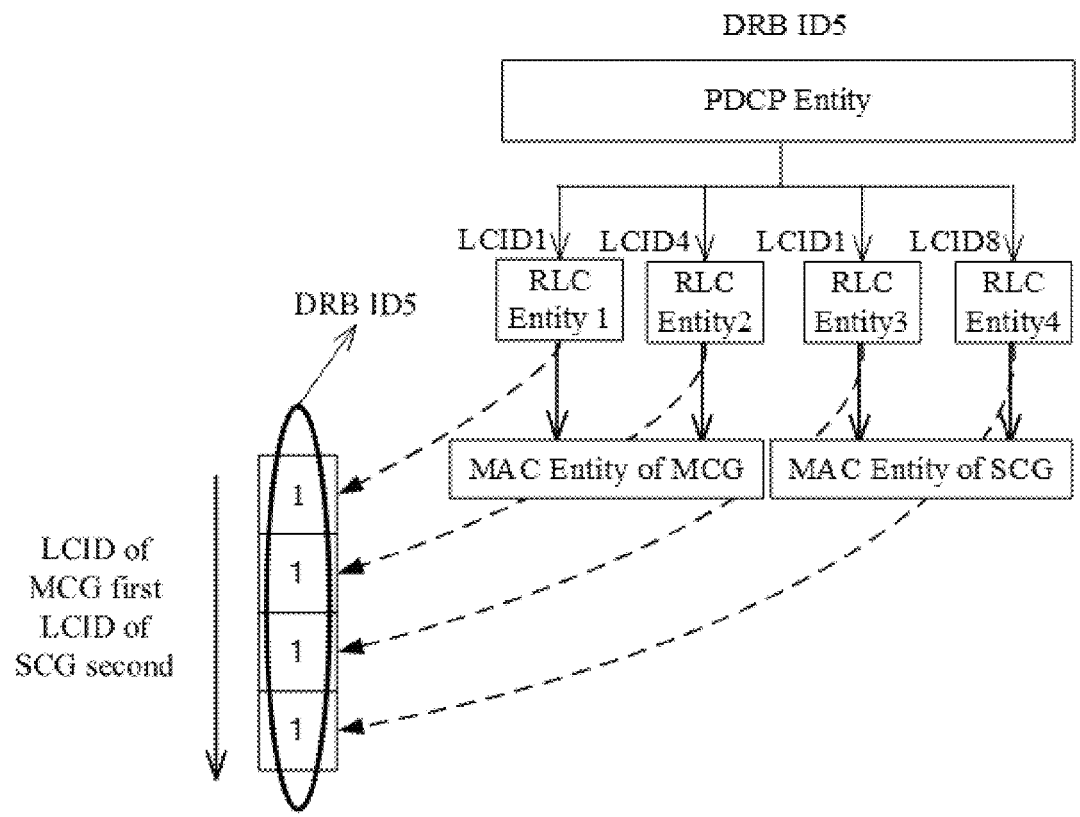
FIG. 9(a) and FIG. 9(b) are schematic diagrams of implementation of first indication information in a DA scenario according to embodiment of the present application.

For example, as illustrated in FIG. 9(a), taking DRB ID5 in FIG. 6(b) as an example, four RLC entities associated with DRB ID5 correspond to LCID 1, LCID 4, LCID 1, and LCID 8, respectively. The 4 bits in the bit columns corresponding to DRB ID5 correspond to LCID 1, LCID 4, LCID 1, and LCID 8 in order from top to bottom. The bit sequence corresponding to DRB ID5 first corresponds to LCID 1 and LCID 4 of MCG from top to bottom, and after corresponding to the RLC entity of MCG, it immediately corresponds to LCID 1 and LCID 8 of SCG. Although the LCIDs corresponding to the RLC entity 1 and the RLC entity 3 belonging to different CGs are both LCID 1, they correspond to the MCG first and then the SCG. Therefore, the first row in the bit column corresponding to the DRB ID5 corresponds to the RLC entity 1 of the MCG and is used to indicate whether the RLC entity 1 is used to transmit duplicate data. The third row corresponds to the RLC entity 3 of the SCG and is used to indicate whether the RLC entity 3 is used to transmit duplicate data.

Another possible implementation manner is that, among the N PDCP entities, multiple RLC entities associated with the PDCP entity for duplicate data transmission based on DC are based on the cell group to which they belong and respectively correspond to the bits divided for each cell group among the plurality of bits.

Figure 9B:
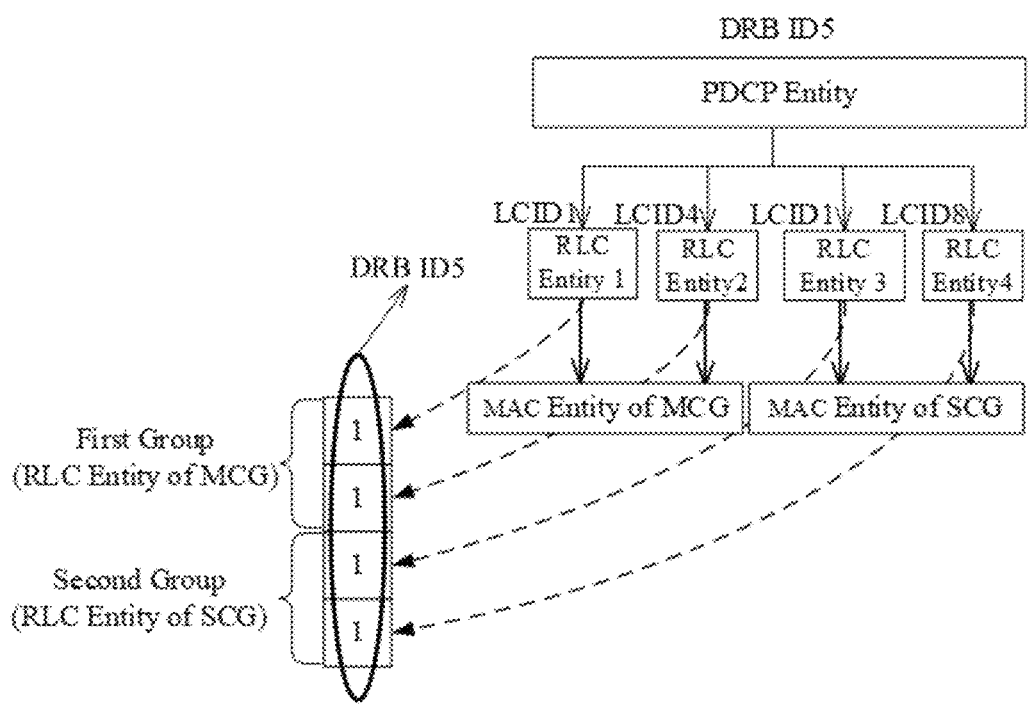

For example, as illustrated in FIG. 9(b), taking DRB ID5 in FIG. 6(b) as an example, four RLC entities associated with DRB ID5 correspond to LCID 1, LCID 4, LCID 1, and LCID 8, respectively. The 4 bits in the bit columns corresponding to DRB ID5 are divided into two groups. The first group is used for the RLC entity corresponding to the MCG and includes the first 2 bits. The second group is used for the RLC entity corresponding to the SCG and includes the last 2 bits. LCID 1 and LCID 4 of MCG correspond to the first two bits in the first group. LCID 1 and LCID 8 of SCG correspond to the first two bits in the second group. Although the LCIDs corresponding to the RLC entity 1 and the RLC entity 3 belonging to different CGs are both LCID 1, the bits corresponding to the RLC entity 1 of the MCG are located in the first group of bits. The bits corresponding to the RLC entity 3 of the SCG are located in the second group of bits, therefore the RLC entities of different CGs can be separately indicated.

When using this method, each RLC entity is based on the cell group to which it belongs, and respectively correspond to the bits divided for the cell group. Even if the number of bits in the first group is more than the number of RLC entities of the MCG, the more bits in the first group are not used to indicate the RLC entity of the SCG, but the bits in the second group are used to indicate the RLC entity of the SCG.

Further, optionally, multiple RLC entities belonging to the same cell group correspond to multiple bits in sequence according to the sequence of the corresponding logical channel identifiers.

For example, as illustrated in FIG. 8, LCID 1, LCID 4, LCID 5, and LCID 8, from small to large, sequentially correspond to the first, second, third, and fourth bits of the first column from front to back.

For another example, as illustrated in FIG. 9(b), LCID 1 and LCID 4 of MCG from small to large correspond to the first and second bits from front to back in the first group; LCID 1 and LCID 8 of the SCG, from small to large, correspond to the first and second bits from front to back in the second group.

When the network device uses the implementation 1 to send the first indication information to the terminal device to control the duplicate data transmission, the network device can activate/deactivate multiple DRBs through one MAC CE. In addition, the network device may indicate the RLC entity used to transmit the duplicate data through the first indication information. Thereby, the duplicate data transmission function of the activated/deactivated DRB is controlled. Under the duplicate data transmission mechanism with more than two copies, effective duplicate data transmission is realized.

Implementation 2

Optionally, the at least one PDCP entity includes one PDCP entity.

The first indication information comprises a first field, the first field is used to indicate the PDCP entity, the first indication information further comprises a second field and/or a third field, the second field is used to indicate that the duplicate data transmission function of the PDCP entity is active or inactive, and the third field is used to indicate the RLC entity used for transmitting the duplicate data among the plurality of RLC entities associated with the PDCP entity.

The first indication information may be carried in the MAC CE, for example.

In this embodiment, the network device separately instructs each PDCP entity, and the first indication information includes the activation/deactivation information of a PDCP entity, and/or information of the RLC entity associated with the PDCP entity used for transmitting duplicate data. Compared with the implementation 1, in the implementation 2, there is no need to additionally define the corresponding relationship between the PDCP entity and the bit. Instead, the information of the PDCP entity is directly obtained according to the content indicated by each field. Moreover, the PDCP duplicate data transmission in the DC scenario and the CA scenario does not need to be defined separately, which reduces implementation complexity.

However, since the first indication information in the implementation 2 only indicates the information of one PDCP entity at a time, when multiple PDCP entities need to be indicated, the embodiment of the present application provides the following two implementations:

One implementation manner is to respectively indicate multiple PDCP entities through multiple first indication information. The multiple pieces of first indication information may be carried in the same MAC CE, or may be carried in different MAC CEs. For example, by sending multiple MAC CEs to respectively instruct multiple PDCP entities to activate the RLC entity used to transmit duplicated data among the RLC entities associated with the PDCP entity.

Another implementation manner is to associate the PDCP entity with another PDCP entity, and the other PDCP entity and the associated PDCP entity are simultaneously activated/deactivated.

In other words, multiple groups of PDCP entities can be set up, and the PDCP entities in each group of PDCP entities are activated/deactivated at the same time. When the duplicate data transmission function of one PDCP entity in the group of PDCP entities is activated, the duplicate data transmission function of the group of PDCP entities is all activated. When the duplicate data transmission function of one PDCP entity in the group of PDCP entities is deactivated, the duplicate data transmission function of the group of PDCP entities is all deactivated. The network device can control the activation/deactivation of multiple PDCP entities by instructing the activation/deactivation of one PDCP entity.

Each field in the first indication information will be described below.

The first indication information includes a first field, the first field is used to indicate a PDCP entity, and the first field may be, for example, a DRB ID corresponding to the PDCP entity.

The first indication information may include a second field, and the second field is used to indicate the activation/deactivation of the duplicate data transmission function of the PDCP entity.

Figure 10:
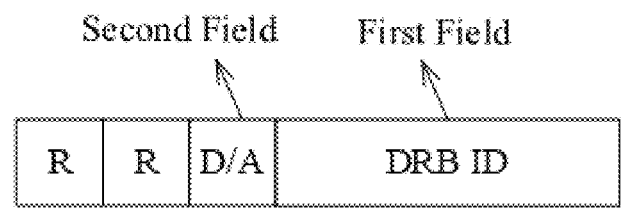
FIG. 10 is a schematic diagram of implementation of first indication information according to an embodiment of the present application.

For example, as illustrated in FIG. 10, the first indication information includes one byte or one octet. The first indication information includes a first field and a second field. The following assumes that the total number of DRBs is 32, and the first field may include 5 bits to indicate different DRB IDs. The second field is a deactivation/activation (D/A) field as illustrated in FIG. 10 and includes 1 bit. This bit is used to indicate the activation/deactivation of the duplicate data transmission function of the DRB ID indicated by the first field. For example, if the bit is 1, it means activation, and if the bit is 0, it means deactivation. After receiving the first indication information, the terminal device can determine the activated/deactivated DRB according to the first field and the second field.

The first indication information may further include a third field, where the third field is used to indicate the RLC entity used for transmitting duplicate data among the multiple RLC entities associated with the PDCP entity.

The third field can indicate the RLC entity used to transmit the duplicate data in the following two implementation manners.

An implementation manner is that the third field includes multiple bits, and the multiple bits respectively correspond to multiple RLC entities associated with the PDCP entity, and each bit is used to indicate whether the RLC entity corresponding to each bit is used for transmitting the duplicate data.

For example, multiple RLC entities associated with a PDCP entity for duplicate data transmission based on CA may sequentially correspond to multiple bits in the third field in the order of corresponding logical channel identifiers. Similar to a mapping method illustrated in FIG. 8.

For another example, multiple RLC entities associated with a PDCP entity for duplicate data transmission based on DC may correspond to multiple bits in the third field in sequence according to the order of the cell group to which they belong. Similar to a mapping method illustrated in FIG. 9(a).

For another example, multiple RLC entities associated with the PDCP entity for duplicate data transmission based on DC may be based on the cell group to which they belong, and respectively correspond to the bits divided for each cell group in the third field. Similar to a mapping method illustrated in FIG. 9(b).

For another example, among the multiple RLC entities associated with the PDCP entity for duplicate data transmission, the RLC entities belonging to the same cell group correspond to the multiple bits in the third field in the order of the corresponding logical channel identifiers.

Another implementation manner is that the third field is used to indicate the RLC entity group used to transmit duplicate data among multiple RLC entities associated with the PDCP entity, wherein the RLC entities in the same RLC entity group are used to transmit duplicate data at the same time.

Optionally, the network device may send the second indication information to the terminal device.

Correspondingly, the terminal device receives the second indication information sent by the network device.

The second indication information is used to indicate multiple RLC entity groups, and part or all of the RLC entities in different RLC entity groups are different. The second indication information may be carried in a radio resource control (RRC) signaling, for example.

The RRC signaling may include an ID of an RLC entity group, and an RLC entity group identifier carried in the RRC signaling is used to indicate the RLC entity group. For example, information of multiple RLC entity groups and the ID of the RLC entity group used to transmit duplicate data in the multiple RLC entity groups are carried in RLC-BearerConfig information element of RRC signaling. The IE includes two domains. One domain may include information of multiple divided RLC entity groups, and the other domain may include identification information of the RLC entity group to be used.

Alternatively, the multiple RLC entity groups may also be pre-configured in the terminal device, for example, agreed in advance by a protocol.

For example, the PDCP entity is associated with 4 RLC entities. The LCIDs corresponding to the four RLC entities are LCID 1, LCID 4, LCID 5, and LCID 8, respectively. The 4 RLC entities are divided into 4 RLC entity groups. The LCIDs corresponding to the RLC entities included in the RLC entity group 1 are LCID 1 and LCID 4. The LCIDs corresponding to the RLC entities included in the RLC entity group 2 are LCID 1 and LCID 5. The LCIDs corresponding to the RLC entities included in the RLC entity group 3 are LCID 4 and LCID 5. The LCIDs corresponding to the RLC entities included in the RLC entity group 4 are LCID 5 and LCID 8. Assuming that the third field includes 2 bits, as illustrated in Table 1, according to the content of the third field, it is possible to know which RLC entity group is used to transmit duplicate data. The RLC entities in the same RLC entity group jointly transmit duplicate data.

TABLE 1

| Third field (2 bits) | RLC entity group ID |
|---|---|
| 00 | RLC entity group 1 (LCID 1, LCID 4) |
| 01 | RLC entity group 2 (LCID 1, LCID 5) |
| 10 | RLC entity group 3 (LCID 4, LCID 5) |
| 11 | RLC entity group 4 (LCID 5, LCID 8) |

Figure 11A:
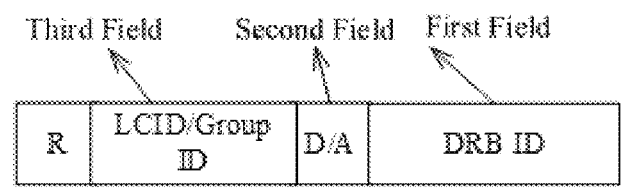
FIG. 11(a) and FIG. 11(b) are schematic diagrams of implementation of first indication information according to an embodiment of the present application.
Figure 11B:
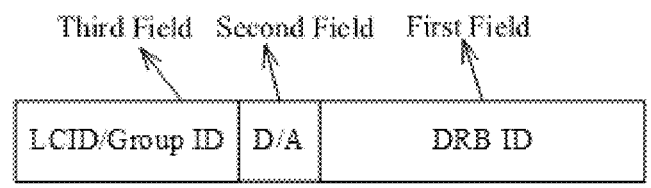

For example, as illustrated in FIG. 11(a) and FIG. 11(b), the first indication information includes one byte or one octet. The first indication information includes a first field, a second field, and a third field. Assuming that the total number of current DRBs is 32, the first field may include 5 bits to indicate different DRB IDs. The second field may be a D/A field, including 1 bit. This bit is used to indicate whether the duplicate data transmission function of the DRB ID indicated by the first field is activated. For example, when the bit is 1, it means activation, and when the bit is 0, it means deactivation. The third field indicates the LCID or the identifier of the RLC entity group (referred to as the group identifier for short) corresponding to the RLC entity used to transmit the duplicate data. After receiving the first indication information, the terminal device can determine whether the duplicate data transmission function of the DRB ID is activated according to the first field and the second field. If the duplicate data transmission function of the DRB ID is activated, the RLC entity used to transmit the duplicate data can be determined according to the third field. In FIG. 11(a), the third field includes 1 bit, which can be used to indicate two RLC entity groups or two RLC entities associated with the DRB ID. In FIG. 11(b), the third field includes 2 bits, which can be used to indicate four RLC entity groups or four RLC entities associated with the DRB ID.

It should be understood that, in this embodiment of the present application, when the second field indicates that the duplicate data transmission function of the PDCP entity is activated, the third field is used to indicate which RLC entities of the RLC entities associated with the PDCP entity are used to transmit the duplicate data. When the second field indicates that the duplicate data transmission function of the DRB ID is deactivated, since there is no need to indicate the RLC entity used to transmit the duplicate data, the third field can optionally indicate the RLC entity used to transmit the non-duplicated data. Other RLC entities do not perform data transmission, rr the third field may also be vacant or indicate other information, which is not limited here. The RLC entity used to transmit non-duplicated data may also be pre-configured, for example, a certain RLC entity of MCG may be pre-configured. The RLC entity is used to transmit non-duplicated data when the duplicate data transmission function of the associated PDCP entity is deactivated.

The first field, the second field, and the third field are described above, but the first indication information does not necessarily include the second field and the third field at the same time. There are the following four situations in the embodiments of the present application, which will be described separately below.

Situation 1

The first indication information includes a first field, a second field, and a third field.

The first field may be used to indicate the PDCP entity, the second field may be used to indicate the activation/deactivation of the PDCP duplicate data transmission function, and the third field may be used to indicate the RLC entity that transmits the duplicate data.

For example, in a structure of the first indication information illustrated in FIG. 11(a) and FIG. 11(b), the first field includes a DRB ID. The second field is a D/A field, which is used to indicate whether the duplicate data transmission function of the DRB ID is activated. The third field is used to indicate the LCID or the ID of the RLC entity group corresponding to the RLC entity that transmits the duplicate data.

Situation 2

The first indication information includes a first field and a third field.

At this time, since the first indication information does not include the second field, optionally, the third field may also be used to indicate the activation/deactivation of the duplicate data transmission function of the PDCP entity.

Optionally, when the third field is a specific value such as 0, the third field is used to indicate that the PDCP entity's duplicate data transmission is inactive; and/or, when the third field is a value other than the specific value, the third field is used to indicate that the duplicate data transmission function of the PDCP entity is active.

Figure 12A:
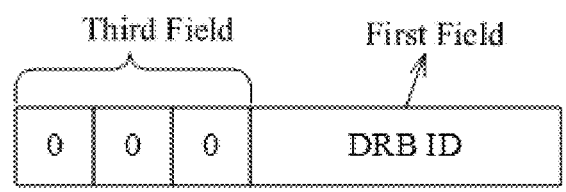
FIG. 12(a) and FIG. 12(b) are schematic diagrams of implementation of first indication information according to an embodiment of the present application.
Figure 12B:
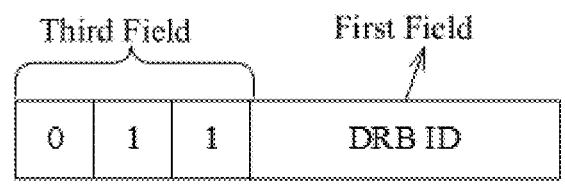

For example, as illustrated in FIG. 12(a) and FIG. 12(b), the first indication information includes a first field and a third field. Assuming that the total number of current DRBs is 32, the first field may include 5 bits to indicate different DRB IDs. The third field may include 3 bits, used to indicate the activation/deactivation of the duplicate data transmission function of the DRB ID, and used to indicate the RLC entity that transmits the duplicate data. As illustrated in FIG. 12(a), when the third field is 000, it can be used to indicate that the duplicate data transmission function of the DRB ID is deactivated. When the third field has other values, it can be used to indicate that the duplicate data transmission function of the DRB ID is activated. In addition, the value of the third field may indicate the LCD or RLC entity group corresponding to the RLC entity used to transmit the duplicate data. For example, as illustrated in FIG. 12(b), when the value of the third field is 011, it can be determined that the duplicate data transmission function of the DRB ID is activated. In addition, the third field indicates that the RLC entity in the RLC entity group corresponding to 011 is used to transmit duplicate data. The third field in FIG. 12(a) and FIG. 12(b) includes 3 bits, but is not limited to this, and the third field may also include 1 bit, 2 bits, and so on.

It should be understood that the first indication information may include one byte or two bytes. For example, when the first indication information includes two bytes, the third field and the first field are located in different bytes of the two bytes. The foregoing FIG. 10, FIG. 11(a), FIG. 11(b), FIG. 12(a), and FIG. 12(b) are all cases where the first indication information includes one byte. At this time, the number of bits in the third field is limited. When the number of RLC entities associated with the PDCP entity is large, the third field is usually used to indicate the RLC entity group that transmits the duplicate data but cannot separately indicate whether each RLC is used to transmit the duplicate data.

Figure 13A:
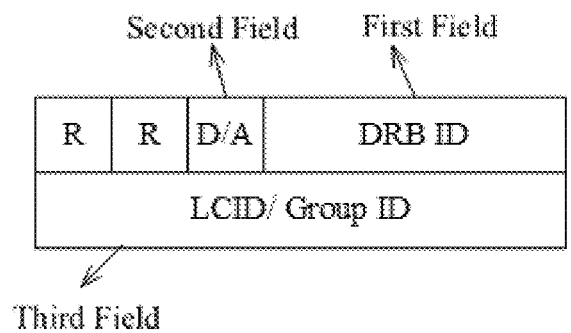
FIG. 13(a) and FIG. 13(b) are schematic diagrams of implementation of first indication information according to an embodiment of the present application.
Figure 13B:
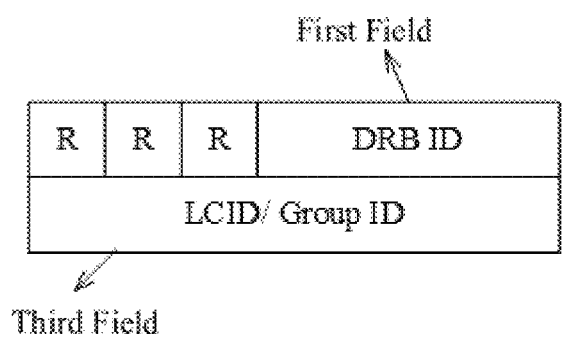

In order to indicate the RLC entity more flexibly and simplify the process of configuring the RLC entity group, in this embodiment of the present application, the third field may not belong to the same byte as the first field. FIG. 13(a) and FIG. 13(b) illustrate the case where the first indication information includes two bytes. In FIG. 13(a), the first field and the second field are located in the first byte, and the third field is located in the second byte. In FIG. 13(b), the first indication information does not include the second field, the first field is located in the first byte, and the third field is located in the second byte. In this way, the third field may include at most 8 bits, and may indicate at most 8 RLC entities. When the duplicate data transmission function of the DRB ID indicated by the first field is activated, the third field may indicate whether a specific RLC entity is used to transmit the duplicate data.

Each bit of the third field may correspond to an LCD. The LCIDs corresponding to the multiple RLC entities associated with the PDCP entity indicated by the first field may be in ascending order, starting from the first bit of the third field. When the PDCP entity is a PDCP entity in a DC scenario, as illustrated in FIG. 14(a), the LCID corresponding to its associated RLC entity can correspond to the bits in the third field in the order from MCG to SCG, from right to left. Or, for example, as illustrated in FIG. 14(b), the associated RLC entity corresponds to the bit divided for the CG according to the CG to which the RLC entity belongs. For example, as illustrated in FIG. 14(c), when the PDCP entity is a PDCP entity in a CA scenario, the LCID corresponding to its associated RLC entity can be in the order of LCID size, such as ascending order, corresponding to bits of the third field from right to left.

Situation 3

The first indication information includes a first field and a second field.

Optionally, if the second field indicates that the duplicate data transmission function of the PDCP entity is activated, the first indication information includes the third field; and/or, If the second field indicates that the duplicate data transmission function of the PDCP entity is deactivated, the first indication information does not include the third field.

According to the foregoing description, the first field and the third field in the first indication information may be located in different bytes, which introduces new bit overhead. However, when the duplicate data transmission function of the PDCP entity is deactivated, there may be no need to indicate the RLC entity used to transmit the duplicate data. Therefore, the third field can be omitted to save bit overhead. When the duplicate data transmission function of the PDCP entity is activated, the third field is used to indicate the RLC entity used to transmit the duplicate data.

Figure 15A:
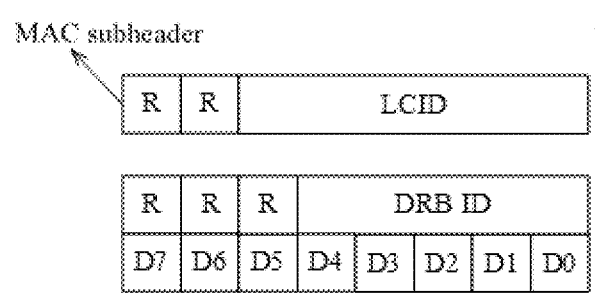
FIG. 15(a) and FIG. 15(b) are schematic diagrams of implementation of first indication information according to an embodiment of the present application.
Figure 15B:
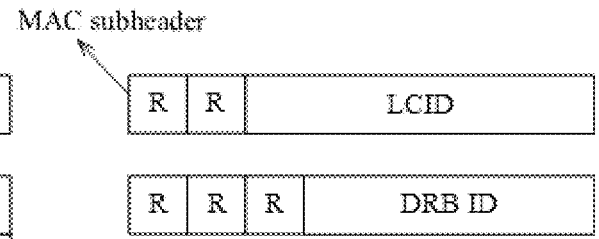

In addition, two types of MAC CE can be set, and formats of the two MAC CEs are different, which can be distinguished by a MAC subheader. The first indication information can be carried in the two types of MAC CE. Here, for example, an LCD in the MAC subheader can be used to distinguish two different types of MAC CE. For example, as illustrated in FIG. 15(a), one type of MAC CE is used to indicate that the duplicate data transmission function of the PDCP entity is activated. This type of MAC CE includes 2 bytes. The first byte includes the first field, which is used to indicate PDCP. The second byte includes a third field, which is used to indicate the RLC entity that transmits the duplicate data. For example, as illustrated in FIG. 15(b), another type of MAC CE is used to indicate the deactivation of the duplicate data transmission function of the PDCP entity. This type of MAC CE may only include 1 byte.

Optionally, a format of the MAC CE used to instruct the deactivation of the duplication data transmission function of the PDCP entity may reuse an existing MAC CE format in a current protocol, such as a MAC CE format described in FIG. 6(a).

Since the format of the MAC CE can be used to distinguish whether a duplicate data transmission function of a BRB ID is activated, a second field in FIG. 15(a) and FIG. 15(b) can also be omitted.

In other words, the second field indicates that the duplicate data transmission function of the PDCP entity is activated. The first indication information includes the third field, and the second field indicates that the duplicate data transmission function of the PDCP entity is deactivated. The first indication information does not include the third field. The terminal device can determine the format of the MAC CE according to the received subheader of the MAC CE, determine whether the duplicate data transmission function of the PDCP entity is activated according to the format of the MAC CE, and determine which RLC entities are used to transmit the duplicate data according to the third field when activated.

Optionally, when the first indication information only includes the first field and the second field, the RLC entity or the RLC entity group used to transmit duplicate data among the multiple RLC entities associated with the PDCP entity may also be dynamically indicated through, for example, RRC signaling.

Situation 4

The first indication information includes the first field, the second field, and the third field. Situation 4 is a special situation of situation 1. Optionally, for the terminal device, the method further includes:

If the second field indicates that the duplicate data transmission function of the PDCP entity is activated, the terminal device reads the third field; and/or, If the second field indicates that the duplicate data transmission function of the PDCP entity is deactivated, the terminal device does not read the third field.

In the situation 3, the content included in the first indication information is different when the PDCP entity is activated and deactivated. That is, the format of MAC CE is different during activation and deactivation. In the situation 4, the first indication information includes the third field, and the format of the MAC CE is always the same. After receiving the first indication information, the terminal device determines whether to read the third field based on reading the first field and the second field.

Figure 16:
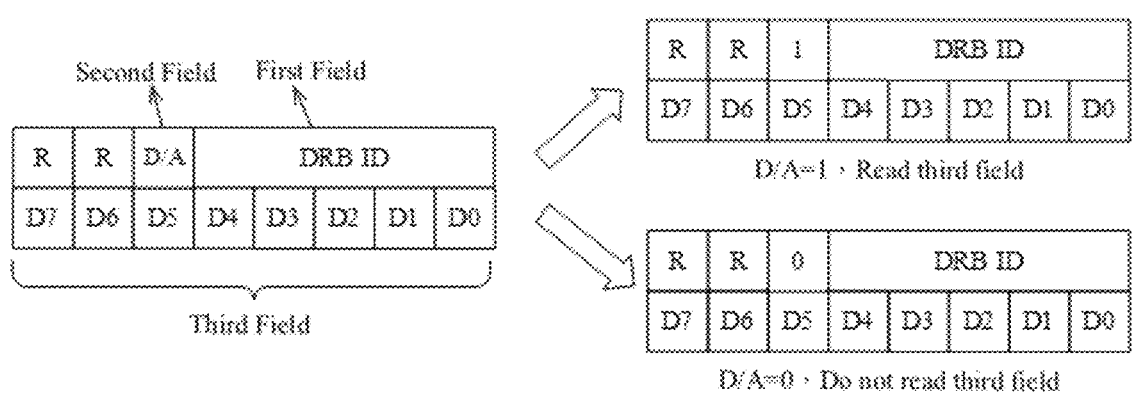
FIG. 16 is a schematic diagram of implementation of first indication information according to an embodiment of the present application.

For example, as illustrated in FIG. 16, if the second field indicates that the duplicate data transmission function of the PDCP entity is deactivated, that is, D/A=0, the terminal device does not need to read the third field. The second field indicates that the duplicate data transmission function of the PDCP entity is activated, that is, when D/A=1, the terminal device reads the third field to learn which RLC entities are used to transmit the duplicate data. In the situation 4, the third field is always carried in the first indication information, and the terminal device may determine whether to read the third field based on the implementation of the terminal device.

In summary, in the implementation 1, the activation/deactivation of the duplicate data transmission function of the PDCP entity and the RLC entity used to transmit the duplicate data are indicated by bitmap, which can realize simultaneous indication of multiple PDCP entities and multiple RLC entities.

In the implementation 2, it is a separate instruction to activate/deactivate the duplicate data transmission function of the PDCP entity. Further, the RLC entity associated with the PDCP entity and used for transmitting the duplicate data can also be indicated, which reduces a overhead of the MAC CE compared to the implementation 1. In addition, by dynamically changing the format of the first indication information and configuring the RLC entity group, the overhead of the MAC CE is further reduced. In addition, the manner in which the terminal device reads the first indication information can be more flexible, which improves efficiency of data processing.

The embodiments of the present application do not make any limitation on the positions of the first field, the second field, and the third field in the byte and the number of bits included in each field, and the above-mentioned drawings are only examples.

It should be noted that, under the condition of no conflict, various implementations described herein and/or technical features in the various implementations can be arbitrarily combined, and the technical solutions thus obtained shall also fall within the protection scope of the disclosure.

It should be understood that, in the various implementations described herein, the sequence number of each of various processes described above does not mean the order of execution. The execution order of each process should be determined by its function and internal logic and should not constitute any limitation on the implementation process of the implementations.

The method for duplicate data transmission according to the embodiments of the present application is described in detail above. The following will describe related devices of implementations in connection with FIG. 17 to FIG. 21. Technical features described in the foregoing method implementations are also applicable to the following device/apparatus implementations.

Figure 17:
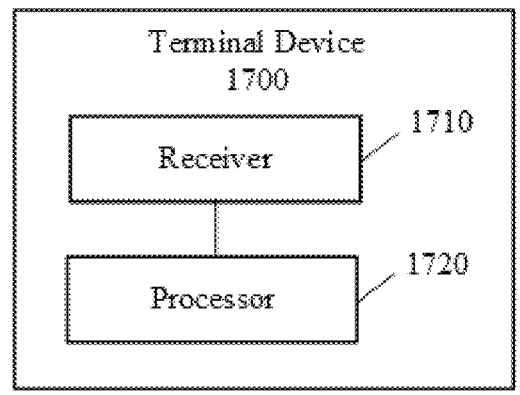
FIG. 17 is a schematic block diagram of a terminal device according to an embodiment of the present application.

FIG. 17 is a schematic block diagram of a terminal device 1700 according to an embodiment of the present application. As illustrated in FIG. 17, the terminal device 1700 includes a receiver 1710 and a processor 1720.

The receiver 1710 is configured to receive first indication information.

The processor 1720 is configured to carry out processing for a PDCP PDU according to the first indication information.

The first indication information is used to indicate that a duplicate data transmission function of at least one PDCP entity is active or inactive and/or indicate an RLC entity used for transmitting duplicate data among a plurality of RLC entities associated with the at least one PDCP entity respectively.

Optionally, the at least one PDCP entity includes: a PDCP entity for duplicate data transmission based on a carrier aggregation CA; and/or, a PDCP entity for duplicate data transmission based on a dual connectivity DC.

Optionally, the at least one PDCP entity comprises N PDCP entities, the first indication information comprises M fields, wherein each field comprises N bits, the N PDCP entities respectively correspond to the N bits, and plurality of RLC entities associated with the same PDCP entity respectively correspond to plurality of bits in the same position in the M fields, where each bit is used to indicate whether the RLC entity corresponding to each bit is used to transmit duplicate data, M and N are positive integers, and M is a maximum number of the RLC entities associated with one PDCP entity.

Optionally, the M fields are respectively located in M bytes.

Optionally, the at least one PDCP entity comprises N PDCP entities, the first indication information includes N fields, and the N PDCP entities respectively correspond to the N fields, wherein each field comprises plurality of bits, and the plurality of bits respectively correspond to the plurality of RLC entities associated with the PDCP entity corresponding to each field, wherein each bit is used to indicate whether the RLC entity corresponding to each bit is used to transmit duplicate data, and N is a positive integer.

Optionally, the N fields are located in N bytes respectively.

Optionally, the plurality of RLC entities associated with the PDCP entity in the N PDCP entities correspond to the plurality of bits in sequence according to an order of a cell group to which the plurality of RLC entities belong.

Optionally, the plurality of RLC entities associated with the PDCP entity for duplicate data transmission based on the dual connectivity in the N PDCP entities respectively correspond to the bits divided for each cell group among the plurality of bits based on a cell group to which the plurality of RLC entities belong.

Optionally, the plurality of RLC entities belonging to the same cell group correspond to plurality of bits in sequence according to an order of corresponding logical channel identifiers.

Optionally, the at least one PDCP entity comprises one PDCP entity, the first indication information comprises a first field, the first field is used to indicate the PDCP entity, the first indication information further comprises a second field and/or a third field, the second field is used to indicate that the duplicate data transmission function of the PDCP entity is active or inactive, and the third field is used to indicate the RLC entity used for transmitting the duplicate data among the plurality of RLC entities associated with the PDCP entity.

Optionally, the PDCP entity is associated with another PDCP entity, and the another PDCP entity is active or inactive at the same time as the PDCP entity.

Optionally, the first indication information does not comprise the second field, and the third field is further used to indicate that the duplicate data transmission function of the PDCP entity is active or inactive.

Optionally, the third field further used to indicate that the duplicate data transmission function of the PDCP entity is active or inactive includes: when the third field is a specific value, the third field is used to indicate that the duplicate data transmission function of the PDCP entity is inactive; when the third field is a value other than the specific value, the third field is used to indicate that the duplicate data transmission function of the PDCP entity is active.

Optionally, the first indication information comprises the second field, if the second field indicates that the duplicate data transmission function of the PDCP entity is active, the first indication information comprises the third field, if the second field indicates that the duplicate data transmission function of the PDCP entity is inactive, the first indication information does not comprise the third field.

Optionally, the first indication information comprises the second field and the third field, and the processor is further used for: if the second field indicates that the duplicate data transmission function of the PDCP entity is active, the terminal device reads the third field; and/or, if the second field indicates that the duplicate data transmission function of the PDCP entity is inactive, the terminal device does not read the third field.

Optionally, the first indication information comprises one byte.

Optionally, the first indication information comprises two bytes, and the third field and the first field are located in different bytes of the two bytes.

Optionally, the first indication information is carried in a MAC CE.

Optionally, the plurality of bits in the third field respectively correspond to the plurality of RLC entities associated with the PDCP entity, and each bit is used to indicate whether the RLC entity corresponding to each bit is used to transmit the duplicate data.

Optionally, the plurality of RLC entities associated with the PDCP entity for duplicate data transmission based on the dual connectivity correspond to the plurality of bits in the third field in sequence according to the order of the cell group to which the plurality of RLC entities belong.

Optionally, the plurality of RLC entities associated with the PDCP entity for duplicate data transmission based on the dual connectivity respectively correspond to the bits divided for each cell group in the third field based on the cell group to which the plurality of RLC entities belong.

Optionally, the RLC entities belonging to the same cell group correspond to the plurality of bits in the third field in sequence according to the order of the corresponding logical channel identifiers.

Optionally, the third field used to indicate the RLC entity used for transmitting the duplicate data among the plurality of RLC entities associated with the PDCP entity includes: wherein the third field is used to indicate an RLC entity group used for transmitting the duplicate data among the plurality of RLC entities, wherein the RLC entities in the same RLC entity group are used to transmit the duplicate data at the same time.

Optionally, the receiver 1710 is configured to: receive the second indication information transmitted by the network device, where the second indication information is used to indicate a plurality of RLC entity groups, and the RLC entities in different RLC entity groups are partially or completely different.

Optionally, the second indication information is carried in a radio resource control RRC signaling.

It should be understood that, the terminal device 1700 can perform operations performed by the terminal device in the method 400, which will not be repeated herein for the sake of simplicity.

Figure 18:
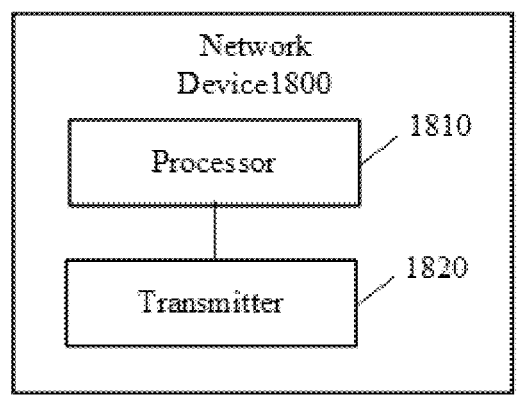
FIG. 18 is a schematic block diagram of a network device according to an embodiment of the present application.

FIG. 18 is a schematic block diagram of a network device according to an embodiment of the present application. As illustrated in FIG. 18, the terminal device 1800 includes a processor 1810 and transmitter 1820.

The processor 1810 is configured to generate first indication information.

The processor 1820 is configured to transmit the first indication information generated by the processor 1810.

The first indication information is used to indicate that a duplicate data transmission function of at least one PDCP entity is active or inactive and/or indicate an RLC entity used for transmitting duplicate data among a plurality of RLC entities associated with the at least one PDCP entity respectively.

Optionally, the at least one PDCP entity includes: a PDCP entity for duplicate data transmission based on a carrier aggregation CA; and/or, a PDCP entity for duplicate data transmission based on a dual connectivity DC.

Optionally, the at least one PDCP entity comprises N PDCP entities, the first indication information comprises M fields, wherein each field comprises N bits, the N PDCP entities respectively correspond to the N bits, and plurality of RLC entities associated with the same PDCP entity respectively correspond to plurality of bits in the same position in the M fields, where each bit is used to indicate whether the RLC entity corresponding to each bit is used to transmit duplicate data, M and N are positive integers, and M is a maximum number of the RLC entities associated with one PDCP entity.

Optionally, the M fields are respectively located in M bytes.

Optionally, the at least one PDCP entity comprises N PDCP entities, the first indication information includes N fields, and the N PDCP entities respectively correspond to the N fields, wherein each field comprises plurality of bits, and the plurality of bits respectively correspond to the plurality of RLC entities associated with the PDCP entity corresponding to each field, wherein each bit is used to indicate whether the RLC entity corresponding to each bit is used to transmit duplicate data, and N is a positive integer.

Optionally, the N fields are located in N bytes respectively.

Optionally, the plurality of RLC entities associated with the PDCP entity in the N PDCP entities correspond to the plurality of bits in sequence according to an order of a cell group to which the plurality of RLC entities belong.

Optionally, the plurality of RLC entities associated with the PDCP entity for duplicate data transmission based on the dual connectivity in the N PDCP entities respectively correspond to the bits divided for each cell group among the plurality of bits based on a cell group to which the plurality of RLC entities belong.

Optionally, the plurality of RLC entities belonging to the same cell group correspond to plurality of bits in sequence according to an order of corresponding logical channel identifiers.

Optionally, the at least one PDCP entity comprises one PDCP entity, the first indication information comprises a first field, the first field is used to indicate the PDCP entity, the first indication information further comprises a second field and/or a third field, the second field is used to indicate that the duplicate data transmission function of the PDCP entity is active or inactive, and the third field is used to indicate the RLC entity used for transmitting the duplicate data among the plurality of RLC entities associated with the PDCP entity.

Optionally, the PDCP entity is associated with another PDCP entity, and the another PDCP entity is active or inactive at the same time as the PDCP entity.

Optionally, the first indication information does not comprise the second field, and the third field is further used to indicate that the duplicate data transmission function of the PDCP entity is active or inactive.

Optionally, the third field further used to indicate that the duplicate data transmission function of the PDCP entity is active or inactive includes: when the third field is a specific value, the third field is used to indicate that the duplicate data transmission function of the PDCP entity is inactive; when the third field is a value other than the specific value, the third field is used to indicate that the duplicate data transmission function of the PDCP entity is active.

Optionally, the first indication information comprises the second field, if the second field indicates that the duplicate data transmission function of the PDCP entity is active, the first indication information comprises the third field, if the second field indicates that the duplicate data transmission function of the PDCP entity is inactive, the first indication information does not comprise the third field.

Optionally, the first indication information comprises the second field and the third field, and the processor is further used for: if the second field indicates that the duplicate data transmission function of the PDCP entity is active, the terminal device reads the third field; and/or, if the second field indicates that the duplicate data transmission function of the PDCP entity is inactive, the terminal device does not read the third field.

Optionally, the first indication information comprises one byte.

Optionally, the first indication information comprises two bytes, and the third field and the first field are located in different bytes of the two bytes.

Optionally, the first indication information is carried in a MAC CE.

Optionally, the plurality of bits in the third field respectively correspond to the plurality of RLC entities associated with the PDCP entity, and each bit is used to indicate whether the RLC entity corresponding to each bit is used to transmit the duplicate data.

Optionally, the plurality of RLC entities associated with the PDCP entity for duplicate data transmission based on the dual connectivity correspond to the plurality of bits in the third field in sequence according to the order of the cell group to which the plurality of RLC entities belong.

Optionally, the plurality of RLC entities associated with the PDCP entity for duplicate data transmission based on the dual connectivity respectively correspond to the bits divided for each cell group in the third field based on the cell group to which the plurality of RLC entities belong.

Optionally, the RLC entities belonging to the same cell group correspond to the plurality of bits in the third field in sequence according to the order of the corresponding logical channel identifiers.

Optionally, the third field used to indicate the RLC entity used for transmitting the duplicate data among the plurality of RLC entities associated with the PDCP entity includes: wherein the third field is used to indicate an RLC entity group used for transmitting the duplicate data among the plurality of RLC entities, wherein the RLC entities in the same RLC entity group are used to transmit the duplicate data at the same time.

Optionally, the receiver 1820 is configured to: transmit the second indication information to the network device, where the second indication information is used to indicate a plurality of RLC entity groups, and the RLC entities in different RLC entity groups are partially or completely different.

Optionally, the second indication information is carried in a radio resource control RRC signaling.

It should be understood that, the network device 1800 can perform operations performed by the terminal device in the method 400, which will not be repeated herein for the sake of simplicity.

Figure 19:
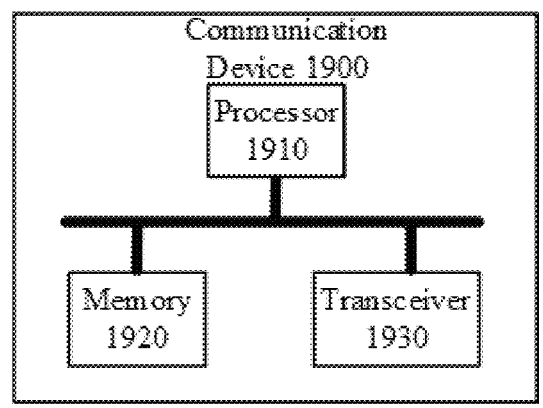
FIG. 19 is a schematic structural diagram of a communication device according to an embodiment of the present application.

FIG. 19 is a schematic structural diagram of a communication device according to an embodiment of the present application. As illustrated in FIG. 19, the communication device 1900 can further include a processor 1910. The processor 1910 can invoke and execute the computer programs stored in the memory to perform the method provided in implementations.

Optionally, as illustrated in FIG. 19, the communication device 1900 may further include a memory 1920. The processor 1910 can call and run a computer program from the memory 1920 to implement the method in the embodiments of the present application.

The memory 1920 may be a separate device independent of the processor 1910, or may be integrated into the processor 1910.

As illustrated in FIG. 19, the communication device 800 can further include a transceiver 1930. The processor 1910 can control the transceiver 830 to communicate with other devices, for example, to send information or data to other devices, or to receive information or data from other devices.

The transceiver 1930 may include a transmitter and a receiver. The transceiver 1930 may further include an antenna, where one or more antennas can be provided.

The communication device 1900 may be the terminal device of implementations, and the communication device 1900 can implement the operations performed by the terminal device described in the foregoing method implementations, which will not be repeated herein for the sake of simplicity.

Alternatively, the communication device 1900 may be the network device of implementations, and the communication device 1900 can implement the operations performed by the network device described in the foregoing method implementations, which will not be repeated herein for the sake of simplicity.

Figure 20:
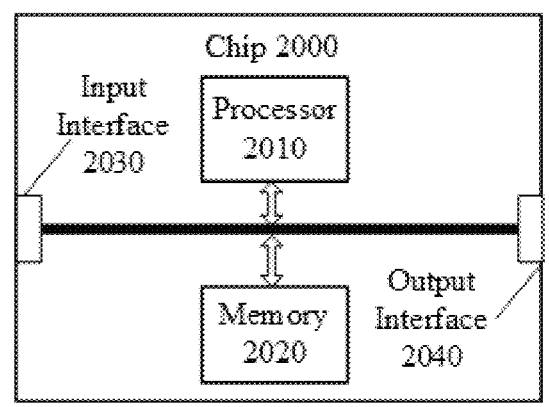
FIG. 20 is a schematic structural diagram of a chip according to an embodiment of the present application.

FIG. 20 is a schematic structural diagram of a chip according to implementations. As illustrated in FIG. 20, a chip 2000 includes a processor 2010. The processor 2010 is configured to invoke and execute computer programs stored in a memory to perform the method provided in implementations.

As illustrated in FIG. 20, the chip 2000 further includes a memory 2020. The processor 2010 can invoke and execute the computer programs stored in the memory 2020 to perform the method provided in implementations.

The memory 2020 may be a separate device independent of the processor 2010 or may be integrated into the processor 2010.

The chip 2000 may further include an input interface 2030. The processor 2010 can control the input interface 2030 to communicate with other devices or chips, for example, to acquire information or data sent by other devices or chips.

The chip 2000 may further include an output interface 2040. The processor 2010 can control the output interface 2040 to communicate with other devices or chips, for example, to output information or data to other devices or chips.

The chip is applicable to the terminal device of implementations. The chip can implement the operations performed by the terminal device described in the foregoing method implementations, which will not be repeated herein for the sake of simplicity.

Alternatively, the chip is applicable to the network device of implementations. The chip can implement the operations performed by the network device described in the foregoing method implementations, which will not be repeated herein for the sake of simplicity.

It should be understood that, the chip herein may also be referred to as a system-on chip (SOC).

The processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor or may be performed by hardware and software modules in the decoding processor. The software module can be located in a storage medium such as a random-access memory (RAM), a flash memory, a read only memory (ROM), a programmable ROM (PROM), or an electrically erasable programmable memory, registers, and the like. The storage medium is located in the memory. The processor reads the information in the memory and completes the steps of the method described above with the hardware of the processor.

It can be understood that, the memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or a flash memory. The volatile memory can be a RAM that acts as an external cache. By way of explanation rather than limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchronous link dynamic random-access memory (synch-link DRAM, SLDRAM), and a direct rambus RAM (DR RAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Figure 21:
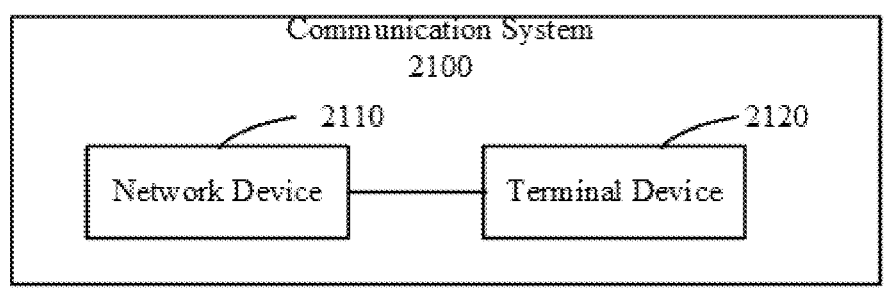
FIG. 21 is a schematic structural diagram of a communication system according to an embodiment of the present application.

FIG. 21 is a schematic block diagram of a communication system 2100 according to implementations. As illustrated in FIG. 21, the communication system 2100 includes a network device 2110 and a terminal device 2120.

The network device 2110 is configured to transmit first indication information to the terminal device 2120.

The terminal device 2120 is configured to receive the first indication information transmitted by the network device 2110.

The first indication information is used to indicate that a duplicate data transmission function of at least one PDCP entity is active or inactive, and/or indicate that an RLC entity used for transmitting duplicate data among a plurality of RLC entities associated with the at least one PDCP entity respectively.

The network device 2110 can implement functions of the method 500 which are implemented by a network device. The network device 2110 may be structured like the network device 1800 illustrated in FIG. 18, which will not be repeated herein for the sake of simplicity.

The terminal device 2120 can implement functions of the method 500 which are implemented by a terminal device. The terminal device 2120 may be structured like the terminal device 1700 illustrated in FIG. 17, which will not be repeated herein for the sake of simplicity.

The embodiments of the present application also provide a computer readable storage medium for storing a computer program. Optionally, the computer readable storage medium may be applied to the network device in the embodiments of the present application, and the computer program causes a computer to perform the corresponding processes implemented by the network device in the methods of the embodiments of the present application, which will not be repeated here for the sake of brevity. Optionally, the computer readable storage medium may be applied to the terminal device in the embodiments of the present application, and the computer program causes the computer to perform the corresponding processes implemented by the terminal device in the methods of the embodiments of the present application, which will not be repeated here for the sake of brevity.

The embodiments of the present application also provide a computer program product, including computer program instructions. Optionally, the computer program product can be applied to the network device in the embodiments of the present application, and the computer program instructions cause the computer to perform the corresponding processes implemented by the network device in the methods according to the embodiments of the present application, which will not be repeated here for the sake of brevity. Optionally, the computer program product can be applied to the terminal device in the embodiments of the present application, and the computer program instructions cause the computer to perform the corresponding processes implemented by the terminal device in the methods according to the embodiments of the present application, which will not be repeated here for the sake of brevity.

The embodiments of the present application also provide a computer program. Optionally, the computer program can be applied to the network device in the embodiments of the present application. When running on a computer, the computer program causes a computer to perform the corresponding processes implemented by the network device in the methods of the embodiments of the present application, which will not be repeated here for the sake of brevity. Optionally, the computer program can be applied to the terminal device in the embodiments of the present application. When running on a computer, the computer program causes the computer to perform the corresponding processes implemented by the terminal device in the methods of the embodiments of the present application, which will not be repeated here for the sake of brevity.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

It should also be understood that, in the embodiments of the present invention, "A corresponding to B" means that A is associated with B, and A can be determined from B. However, it should also be understood that determining A from B does not mean that A is determined only from B, and A can also be determined from B and/or other information.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

According to the embodiments provided in the present application, it should be understood that the systems, devices, and methods disclosed can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A method used for duplicate data transmission, applied to a communication device, comprising:
    transmitting a first indication information; or,
    receiving the first indication information;
    wherein the first indication information is used to indicate that a duplicate data transmission function of at least one packet data convergence protocol (PDCP) entity is active or inactive, and/or indicate that a radio link control (RLC) entity used for transmitting duplicate data among a plurality of RLC entities associated with the at least one PDCP entity respectively;
    wherein the first indication information is carried in a media access control control element (MAC CE), the first indication information comprises one byte, the byte comprises a first field and a third field, and the first field comprises a data radio bearer (DRB) identifier (ID) corresponding to the PDCP entity.

2. The method according to claim 1, wherein the at least one PDCP entity comprises:
    a PDCP entity for duplicate data transmission based on a carrier aggregation (CA); and/or,
    a PDCP entity for duplicate data transmission based on a dual connectivity (DC).

3. The method according to claim 1, wherein the at least one PDCP entity comprises one PDCP entity, the first indication information further comprises a second field, the second field is used to indicate that the duplicate data transmission function of the PDCP entity is active or inactive, and the third field is used to indicate the RLC entity used for transmitting the duplicate data among the plurality of RLC entities associated with the PDCP entity.

4. The method according to claim 1, wherein the at least one PDCP entity comprises one PDCP entity, the first indication information does not comprise a second field, and the third field is used to indicate the RLC entity used for transmitting the duplicate data among the plurality of RLC entities associated with the PDCP entity and further used to indicate that the duplicate data transmission function of the PDCP entity is active or inactive.

5. The method according to claim 3, wherein the plurality of bits in the third field respectively correspond to the plurality of RLC entities associated with the PDCP entity, and each bit is used to indicate whether the RLC entity corresponding to each bit is used to transmit the duplicate data.

6. The method according to of claim 3, wherein the plurality of RLC entities associated with the PDCP entity for duplicate data transmission based on the dual connectivity correspond to the plurality of bits in the third field in sequence according to the order of the cell group to which the plurality of RLC entities belong.

7. A communication device used for duplicate data transmission, comprising:
 a transmitter configured to transmit a first indication information; or,
 a receiver configured to receive the first indication information;
 wherein the first indication information is used to indicate that a duplicate data transmission function of at least one packet data convergence protocol (PDCP) entity is active or inactive, and/or indicate that a radio link control (RLC) entity used for transmitting duplicate data among a plurality of RLC entities associated with the at least one PDCP entity respectively;
 wherein the first indication information is carried in a media access control control element (MAC CE), the first indication information comprises one byte, the byte comprises a first field and a third field, and the first field comprises a data radio bearer (DRB) identifier (ID) corresponding to the PDCP entity.

8. The communication device according to claim 7, wherein the at least one PDCP entity comprises:
 a PDCP entity for duplicate data transmission based on a carrier aggregation (CA); and/or,
 a PDCP entity for duplicate data transmission based on a dual connectivity (DC).

9. The communication device according to claim 7, wherein the at least one PDCP entity comprises one PDCP entity, the first indication information further comprises a second field, the second field is used to indicate that the duplicate data transmission function of the PDCP entity is active or inactive, and the third field is used to indicate the RLC entity used for transmitting the duplicate data among the plurality of RLC entities associated with the PDCP entity.

10. The communication device according to claim 7, wherein the at least one PDCP entity comprises one PDCP entity, the first indication information does not comprise a second field, and the third field is used to indicate the RLC entity used for transmitting the duplicate data among the plurality of RLC entities associated with the PDCP entity and further used to indicate that the duplicate data transmission function of the PDCP entity is active or inactive.

11. The communication device according to claim 9, wherein the plurality of bits in the third field respectively correspond to the plurality of RLC entities associated with the PDCP entity, and each bit is used to indicate whether the RLC entity corresponding to each bit is used to transmit the duplicate data.

12. The communication device according to claim 9, wherein the plurality of RLC entities associated with the PDCP entity for duplicate data transmission based on the dual connectivity correspond to the plurality of bits in the third field in sequence according to the order of the cell group to which the plurality of RLC entities belong.

13. A terminal device, comprising:
 a receiver configured to receive first indication information; and
 a processor configured to carry out processing for a packet data convergence protocol (PDCP) protocol data unit (PDU) according to the first indication information;
 wherein the first indication information is used to indicate that a duplicate data transmission function of at least one PDCP entity is active or inactive and/or indicate a radio link control (RLC) entity used for transmitting duplicate data among a plurality of RLC entities associated with the at least one PDCP entity respectively;
 wherein the first indication information is carried in a media access control control element (MAC CE), the first indication information comprises one byte, the byte comprises a first field and a third field, and the first field comprises a data radio bearer (DRB) identifier (ID) corresponding to the PDCP entity.

14. The terminal device according to claim 13, wherein the at least one PDCP entity comprises:
 a PDCP entity for duplicate data transmission based on a carrier aggregation (CA); and/or,
 a PDCP entity for duplicate data transmission based on a dual connectivity (DC).

15. The terminal device according to claim 13, wherein the at least one PDCP entity comprises one PDCP entity, the first indication information further comprises a second field, the second field is used to indicate that the duplicate data transmission function of the PDCP entity is active or inactive, and the third field is used to indicate the RLC entity used for transmitting the duplicate data among the plurality of RLC entities associated with the PDCP entity.

16. The terminal device according to claim 13, wherein the at least one PDCP entity comprises one PDCP entity, the first indication information does not comprise a second field, and the third field is used to indicate the RLC entity used for transmitting the duplicate data among the plurality of RLC entities associated with the PDCP entity and further used to indicate that the duplicate data transmission function of the PDCP entity is active or inactive.

17. The terminal device according to claim 15, wherein the plurality of bits in the third field respectively correspond to the plurality of RLC entities associated with the PDCP entity, and each bit is used to indicate whether the RLC entity corresponding to each bit is used to transmit the duplicate data.

* * * * *